US012764505B2

(12) United States Patent
Zhu et al.

(10) Patent No.: US 12,764,505 B2
(45) Date of Patent: Oct. 13, 2026

(54) METHOD AND APPARATUS FOR CHARGING

(71) Applicant: TELEFONAKTIEBOLAGET LM ERICSSON (PUBL), Stockholm (SE)

(72) Inventors: Jinyin Zhu, Shanghai (CN); Zhansheng Wei, Shanghai (CN); Yong Yang, Kållered (SE)

(73) Assignee: TELEFONAKTIEBOLAGET LM ERICSSON (PUBL ), Stockholm (SE)

( * ) Notice: Subject to any disclaimer, the term of this patent is extended or adjusted under 35 U.S.C. 154(b) by 293 days.

(21) Appl. No.: 18/292,762

(22) PCT Filed: Jul. 28, 2022

(86) PCT No.: PCT/CN2022/108609
§ 371 (c)(1),
(2) Date: Jan. 26, 2024

(87) PCT Pub. No.: WO2023/006031
PCT Pub. Date: Feb. 2, 2023

(65) Prior Publication Data

US 2025/0350909 A1 Nov. 13, 2025

(30) Foreign Application Priority Data

Jul. 29, 2021 (WO) ................ PCT/CN2021/109263

(51) Int. Cl.
*H04W 4/24* (2024.01)
*H04L 12/14* (2006.01)

(52) U.S. Cl.
CPC ........... *H04W 4/24* (2013.01); *H04L 12/1407* (2013.01)

(58) Field of Classification Search
None
See application file for complete search history.

(56) References Cited

U.S. PATENT DOCUMENTS 11,490,450 B1 * 11/2022 Balmakhtar ............ H04L 69/08
2020/0213909 A1 * 7/2020 Oh ...................... H04L 12/1407
(Continued)

FOREIGN PATENT DOCUMENTS

CN 109756430 A 5/2019
WO 2021144041 A1 7/2021

OTHER PUBLICATIONS

3GPP TS 29.244 V16.3.1 (Apr. 2020), Technical Specification: 3rd Generation Partnership Project; Technical Specification Group Core Network and Terminals; Interface between the Control Plane and the User Plane Nodes; Stage 3(Release 16), Apr. 3, 2020 (Year: 2020).*
(Continued)

*Primary Examiner* — Hassan A Phillips
*Assistant Examiner* — Gautam Sharma
(74) *Attorney, Agent, or Firm* — Ericsson Inc.

(57) ABSTRACT

Embodiments of the present disclosure provide method and apparatus for charging. A method performed by a user plane function entity comprises receiving a first message from a control plane function entity. The first message comprises one or more information elements referencing one or more pre-defined packet detection rules (PDRs) configured in the user plane function entity. The one or more pre-defined PDRs specify one or more predefined usage reporting rules (URRs). The method further comprises activating the one or more predefined PDRs. The method further comprises generating a usage report for at least one of the one or more predefined URRs. The usage report comprises information for describing received user traffic which is related to the at least one of the one or more predefined URRs. The method further comprises sending a second message comprising the usage report to the control plane function entity.

24 Claims, 7 Drawing Sheets

(56) References Cited

U.S. PATENT DOCUMENTS

| | | | | |
|---|---|---|---|---|
| 2020/0267077 A1* | 8/2020 | Williams | H04L 47/2441 |
| 2020/0267085 A1* | 8/2020 | Nie | H04L 47/24 |
| 2020/0329008 A1* | 10/2020 | Dao | H04L 67/63 |
| 2021/0250839 A1* | 8/2021 | Parikh | H04W 40/02 |
| 2022/0116822 A1* | 4/2022 | Sahin | H04L 67/56 |
| 2022/0159496 A1* | 5/2022 | Midkiff | H04W 88/10 |
| 2022/0278955 A1* | 9/2022 | Roy | H04L 67/1021 |
| 2022/0338142 A1* | 10/2022 | Minokuchi | H04W 56/001 |
| 2023/0011545 A1* | 1/2023 | Fodrini | H04M 15/7652 |
| 2023/0036645 A1* | 2/2023 | Qiao | H04L 12/4633 |
| 2023/0092940 A1* | 3/2023 | Gundavelli | H04M 15/66 455/405 |
| 2023/0164186 A1* | 5/2023 | Li | H04L 69/22 726/3 |
| 2023/0164641 A1* | 5/2023 | Purkayastha | H04W 36/0022 370/331 |
| 2023/0388756 A1* | 11/2023 | Jia | H04W 4/06 |

OTHER PUBLICATIONS

Huawei; "Update of the TS to prepare it for 5GC/N4", C4-175385, 3GPP TSG CT4 Meeting #80, Kochi, India; Oct. 23-27, 2017.

3GPP 3rd Generation Partnership Project, Technical Specification Group Core Network and Terminals;Interface between the Control Plane and the User Plane Nodes;Stage 3(Release 16), 3GPP TS 29.244 V16.9.1, Sep. 2021 https://www.3gpp.org/ftp/Specs/archive/29_series/29.244.

3GPP 3rd Generation Partnership Project, Technical Specification Group Services and System Aspects; Telecommunication management; Charging management; 5G system, charging service;Stage 3 (Release 16), 3GPP TS 32.291 V16.10.0, Dec. 2021 https://www.3gpp.org/ftp/Specs/archive/32_series/32.291.

3GPP 3rd Generation Partnership Project;Technical Specification Group Services and System Aspects; Telecommunication management; Charging management; 5G system; Services, operations and procedures of charging using Service Based Interface (SBI) (Release 16), 3GPP TS 32.290 V16.10.0, Dec. 2021 https://www.3gpp.org/ftp/Specs/archive/32_series/32.290.

3GPP TS 23.503 V17.1.0, 3rd Generation Partnership Project;Technical Specification Group Services and System Aspects;Policy and charging control framework for the 5G System (5GS); Stage 2 (Release 17) (Jun. 2021) https://www.3gpp.org/ftp/Specs/archive/23_series/23.503.

3GPP TS 29.244 V17.1.0 3rd Generation Partnership Project; Technical Specification Group Core Network and Terminals; Interface between the Control Plane and the User Plane Nodes; Stage 3 (Release 17) Jun. 2021 (Jun. 2021) https://www.3gpp.org/ftp/Specs/archive/29_series/29.244.

3GPP; 3rd Generation Partnership Project; Technical Specification Group Services and System Aspects; Architecture enhancements for control and user plane separation of EPC nodes; Stage 2 (Release 17), 3GPP TS 23.214 V17.0.0 (Jun. 2021) https://www.3gpp.org/ftp/Specs/archive/23_series/23.214.

3rd Generation Partnership Project; Technical Specification Group Services and System Aspects; Policy and charging control architecture (Release 17), 3GPP TS 23.203 V17.1.0 (Jun. 2021). https://www.3gpp.org/ftp/Specs/archive/23_series/23.203.

C4-171252, Huawei, Pseudo-CR on Provisioning of predefined PCC/ADC rules, 3GPP TSG CT4 Meeting #76, Feb. 13-17, 2017, Dubrovnik, Croatia.

C4-195515, Ericsson, Reporting PDR ID in a Usage Report, 3GPP TSG-CT WG4 Meeting #95, Nov. 11-15, 2019, Reno, US.

C4-202009, Ericsson, Nokia, Nokia Shanghai Bell, Huawei, Activating a predefined FAR/URR/QER, 3GPP TSG-CT WG4 Meeting #97e, Apr. 15-24, 2020, E-Meeting.

C4-214642, Ericsson, Predefined Rule Name, 3GPP TSG-CT WG4 Meeting #105-e, Aug. 17-Aug. 27, 2021, E-Meeting.

International Search Report and Written Opinion issued on PCT/CN2022/108609 with mailing date of Oct. 26, 2022.

* cited by examiner

METHOD AND APPARATUS FOR CHARGING

CROSS-REFERENCE TO RELATED APPLICATIONS

This patent application is a submission under 35 U.S.C. § 371 for U.S. national stage patent application of international application no. PCT/CN2022/108609 filed on Jul. 28, 2022 and entitled "METHOD AND APPARATUS FOR CHARGING," which claims priority to PCT/CN2021/109263 filed on Jul. 29, 2021, the entireties of both of which are incorporated herein by reference.

TECHNICAL FIELD

The non-limiting and exemplary embodiments of the present disclosure generally relate to the technical field of communications, and specifically to methods and apparatuses for charging.

BACKGROUND

This section introduces aspects that may facilitate a better understanding of the disclosure. Accordingly, the statements of this section are to be read in this light and are not to be understood as admissions about what is in the prior art or what is not in the prior art.

In communication networks for example NR (new radio) or LTE (long term evolution) as defined by 3rd Generation Partnership Project (3GPP), there is provided network functions that implement charging mechanisms such as offline and/or online charging mechanisms. In order to support these charging mechanisms, the network functions perform real-time monitoring of resource usage in order to detect relevant chargeable events. Typical examples of network resource usage are a voice call of certain duration, a transport of a certain volume of data, or a submission of a multimedia (MM) of a certain size, etc. The network resource usage requests may be initiated by a user equipment (UE) (MO (Mobile Originated) case) or by the network (MT (Mobile Terminated) case). Offline and online charging may be performed simultaneously and independently for the same chargeable event.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Converged charging is supported over N40 interface which is a reference point between SMF (Session Management Function) and CHF (charging function)), i.e., for a charging session, some RGs (rating groups) may use online charging method while the other RGs may use offline charging method. The determination of online or offline of an RG depends on the PCC (policy and charging control) rule(s) associated to the RG. For each PCC rule, whether to use online or offline charging method may be decided by a policy control entity (such as Policy Control Function (PCF)) or by local configuration.

Pre-defined PDR(s) (Packet Detection Rule(s)) is supported over an interface (such as N4 or Sxb) between a control plane (CP) and a user plane (UP). The pre-defined PDR(s) together with associated FAR (Forwarding Action Rule)/QER (QOS (quality of service) Enforcement Rule)/URR(s) (Usage Reporting Rule(s)) may be configured locally in UP function and is activated by CP function by for example provisioning Activate Predefined Rules IE(s) (information element(s)) in the Create PDR IE or an Update PDR IE.

When traffic matching the pre-defined PDR(s) is detected, UP function may generate Usage Report(s) and send it to the CP function.

Activation and Deactivation of Pre-Defined PDRs

Clause 5.19 of 3GPP TS 29.244 V17.1.0, the disclosure of which is incorporated by reference herein in its entirety, describes activation and deactivation of Pre-defined PDRs as following.

To reduce the signaling overhead for establishing a Packet Forwarding Control Protocol (PFCP) session (for a protocol data unit (PDU) session or a PDN (Packet Data Network) connection) and improve the signaling efficiency, the CP and UP functions may support the Activation and Deactivation of a Pre-defined PDR (ADPDP) feature as described below.

When both the CP function and the UP function support the ADPDP feature, the CP function may activate one or more pre-defined PDRs for a PFCP session during a PFCP Session Establishment or a PFCP Session Modification procedure. A pre-defined PDR shall be configured in the UP function before it can be activated in a PFCP session.

A pre-defined PDR may contain all the necessary packets detection information to identify a service data flow or application traffic which may be common to many PFCP sessions, and it may be configured in the UPF (User plane Function) associated with a pre-defined FAR, one or more pre-defined QER(s), and/or one or more pre-defined URR (s).

Any PFCP session specific information, e.g. traffic endpoint information, may not be part of a pre-defined PDR and is provisioned before or during the activation of the pre-defined PDR.

To activate one or more pre-defined PDR(s), the CP function shall provide one or more Activate Predefined Rules IE(s) in a Create PDR IE in a PFCP Session Establishment Request, or in a Create PDR IE or an Update PDR IE in a PFCP Session Modification Request message, that references a pre-defined PDR configured in the UP function, with the following information in the Create PDR or Update PDR IE:

- the traffic endpoint that the traffic shall match (e.g. Local F-TEID (Fully Qualified TEID (Tunnel Endpoint Identifier)), UE IP (Internet protocol) Address or Traffic Endpoint ID (identifier));
- optionally the QFI (QOS Flow Identifier) that the traffic shall match, e.g. for a UL (uplink) PDR where UL QoS flow binding verification is required (see clause 5.4.2 of 3GPP TS 29.244 V17.1.0);
- the precedence to be applied by the UP function among all PDRs of the PFCP session;
- optionally, an FAR containing instructions related to the processing of the packets matching the pre-defined PDR(s); when present, the UP function shall enforce it instead of the one defined in the pre-defined PDR(s) if any;
- optionally, one or more URRs to be used in addition to any URR(s) specified in the pre-defined PDR(s) (e.g. for session level Usage Monitoring);
- optionally, one or more QERs to be applied in addition to any QER(s) specified in the pre-defined PDR (e.g. for APN-AMBR (Access Point Name-Aggregated Maximum Bitrate) enforcement).

When a pre-defined PDR is activated for a given PDR, an incoming packet matches the PDR if it matches the traffic endpoint, and the QFI if provisioned and one of the activated pre-defined PDR(s).

The CP function may update the use of pre-defined PDRs that are already activated in a PFCP session by including one or more Activate Predefined Rules IE(s) or Deactivate Predefined Rules IE(s) in a PFCP Session Modification Request and/or by updating the parameters provisioned in the PDR.

NOTE: The CP function cannot change a pre-defined PDR via PFCP session related procedure.

The CP function may deactivate a pre-defined PDR that is already activated in a PFCP session by including the Deactivate Predefined Rules IE in a PFCP Session Modification Request requesting to deactivate the predefined PDR(s).

In addition, this feature allows to define a group of pre-defined PDRs which can be activated, updated, and deactivated together. This allows the CP function to further optimize the signaling towards the UP function.

To activate, update, or deactivate a group of pre-defined PDRs, the CP shall follow the same procedure as for activating, updating, and deactivating a pre-defined PDR, but it shall use an Activate Predefined Rules IE that refers to a group of pre-defined PDRs.

Usage Report IE within PFCP Session Report Request

Clause 7.5.8.3 of 3GPP TS 29.244 V17.1.0 describes Usage Report IE within PFCP Session Report Request as Table 1. Table 1 is same as Table 7.5.8.3-1 of 3GPP TS 29.244 V17.1.0.

TABLE 1

Usage Report IE within PFCP Session Report Request
Octet 1 and 2 Usage Report IE Type = 80 (decimal)
Octets 3 and 4 Length = n

| Information elements | P | Condition/Comment | Appl. Sxa | Sxb | Sxc | N4 | IE Type |
|---|---|---|---|---|---|---|---|
| URR ID | | This IE shall identify the URR for which usage is reported. | X | X | X | X | URR ID |
| UR-SEQN | | This IE shall uniquely identify the Usage Report for the URR (see clause 5.2.2.3). | X | X | X | X | UR-SEQN |
| Usage Report Trigger | | This IE shall identify the trigger for this report. | X | X | X | X | Usage Report Trigger |
| Start Time | | This IE shall be present, except if the Usage Report Trigger indicates 'Start of Traffic', 'Stop of Traffic' or 'MAC Addresses Reporting'. When present, this IE shall provide the timestamp when the collection of the information in this report was started. | X | X | X | X | Start Time |
| End Time | | This IE shall be present, except if the Usage Report Trigger indicates 'Start of Traffic', 'Stop of Traffic' or 'MAC Addresses Reporting'. When present, this IE shall provide the timestamp when the collection of the information in this report was generated. | X | X | X | X | End Time |
| Volume Measurement | | This IE shall be present if a volume measurement needs to be reported. (NOTE 2) | X | X | X | X | Volume Measurement |
| Duration Measurement | | This IE shall be present if a duration measurement needs to be reported. (NOTE 2) | X | X | X | X | Duration Measurement |
| Application Detection Information | | This IE shall be present if application detection information needs to be reported. | — | X | X | X | Application Detection Information |
| UE IP address | | This IE shall be present if the start or stop of an application has been detected and no UE IP address was provisioned in the PDI. See NOTE 1. | — | — | X | X | UE IP address |
| Network Instance | | This IE shall be present if the start or stop of an application has been detected, no UE IP address was provisioned in the PDI and multiple PDNs with overlapping IP addresses are used in the UP function. See NOTE 1. | — | — | X | X | Network Instance |
| Time of First Packet | | This IE shall be present if available for this URR. | — | X | X | X | Time of First Packet |
| Time of Last Packet | | This IE shall be present if available for this URR. | — | X | X | X | Time of Last Packet |
| Usage Information | | This IE shall be present if the UP function reports Usage Reports before and after a Monitoring Time, or before and after QoS enforcement. When present, it shall indicate whether the usage is reported for the period before or after that time, or before or after QoS enforcement. | X | X | X | X | Usage Information |
| Query URR Reference | | This IE shall be present if this usage report is sent as a result of a query URR received in a PFCP Session Modification Request and the Query URR Reference IE was present in the PFCP Session Modification Request. When present, it shall be set to the Query URR Reference value received in the PFCP Session Modification Request. | X | X | X | X | Query URR Reference |
| Event Time Stamp | | This IE shall be present, if the report is related to an event. When present, it shall be set to the time when the event occurs. Several IEs with the same IE type may be present to report multiple occurrences for an event for this URR ID. | — | X | X | X | Time Stamp |

TABLE 1-continued

| Usage Report IE within PFCP Session Report Request<br>Octet 1 and 2 Usage Report IE Type = 80 (decimal)<br>Octets 3 and 4 Length = n | | | | | | | |
|---|---|---|---|---|---|---|---|
| Information | | | Appl. | | | | |
| elements | P | Condition/Comment | Sxa | Sxb | Sxc | N4 | IE Type |
| Ethernet Traffic Information | | This IE shall be present if Ethernet Traffic Information needs to be reported. See Table 7.5.8.3-3. | — | — | — | X | Ethernet Traffic Information |
| Join IP Muticast Information | | This IE shall be present if the UPF needs to report that it has added the PDU session to the DL replication tree of a new IP multicast flow.<br>Several IEs with the same IE type may be present to report multiple IP multicast flows added to the PDU session. | — | — | — | X | Join IP Multicast Information |
| Leave IP Muticast Information | | This IE shall be present if the UPF needs to report that it has removed the PDU session from the DL replication tree of an IP multicast flow.<br>Several IEs with the same IE type may be present to report multiple IP multicast flows removed from the PDU session. | — | — | — | X | Leave IP Multicast Information |

NOTE 1:
This is the case for unsolicited application reporting by the TDF. The Network instance is required when the UE IP address cannot be used to determine the corresponding PDN connection.
(NOTE 2):
The UP function may send a Usage Report with the Volume/Duration Measurement set to zero.

There may be some problems in the existing charging mechanisms. One or more predefined rule (identified by a Predefined Rule Name in the Activate Predefined Rules) can be activated via provisioning a Create/Update PDR IE as specified in clause 5.19 of 3GPP TS 29.244 V17.1.0, where the associated URR(s) may be explicitly provisioned, but may also predefined in the UP function within a predefined rule.

Especially, within a Create/Update PDR IE, when multiple instances of "Activate Predefined Rules" are included and representing multiple Predefined Rule Names and when different multiple predefined rule is predefined with different predefined URRs (i.e. without explicitly provisioning in URR ID IE in the Create/Update PDR IE, these URRs are predefined corresponding to different measurement methods, thresholds, reporting triggers and so on.

Upon receiving a Usage Report with a predefined URR ID, the CP function shall be able to handle the usage report. However, this requires both CP function UP function to have 1:1 mapping between predefined rules and predefined URRs, which results in a large configuration in both CP and UP function. For example, for the URR (with the same contents) but for different purposes, e.g. for charging and for usage monitoring, two different URRs have to predefined in order to make CP function to know how to deal with the corresponding usage report. This greatly defeats the benefit to introduce predefined rule where many UEs/PDU sessions are sharing same/similar URRs.

For example, in a scenario where the URR(s) associated to the pre-defined PDR(s) is only configured in the UP function, if multiple pre-defined PDRs have been activated for a PDU session, when CP function receives usage report (s) from UP function, CP function does not know which pre-defined PCC rule (pointing to the pre-defined PDR(s) in the UP function) is associated with the usage report(s) or the URR ID. In this case, CP function does not know whether to use online or offline charging method for this usage report(s). Furthermore, if there are other parameters, e.g., usage monitoring, QoS parameters that need to be enforced upon the usage report, SMF does not know how to handle it either.

FIG. 1 shows an example of a charging mechanism. For a PDU session X, two PCC rules are activated: service-1-online and service-2-offline. Service-1-online is associated with pre-defined PDR1 and service-2-offline is associated with pre-defined PDR2. The pre-defined PDR1 defines that the traffic of application (APP) ID 1-1 is associated with URR1-1 and the traffic of APP ID 1-2 is associated with URR1-2. The pre-defined PDR2 defines that the traffic of APP ID 2-1 is associated with URR2-1 and the traffic of APP ID 2-2 is associated with URR2-2.

When UP function reports the user report(s) URR1-1 for a traffic matching APP ID 1-1 of pre-defined PDR1, CP function does not know whether to use online or offline for the URR1-1 since both online and offline charging are used for the same PDU session.

To overcome or mitigate at least one of above mentioned problems or other problems, the embodiments of the present disclosure propose an improved solution for charging.

In an embodiment, it is proposed to simply include at least one Predefined Rule Name and/or PDR ID in the Usage Report if the URR ID included in the Usage report is a predefined URR and it is not explicitly provisioned in the Create/Update PDR. This will enable CP function to identify the predefined PCC rule and derive how to deal with the usage report. For example, The Predefined Rule Name may be present to identify a predefined rule if the usage report is generated for a predefined URR which was activated via an Activate Predefined Rules IE in a Create PDR IE or an Update PDR IE.

In a first aspect of the disclosure, there is provided a method performed by a user plane function entity. The method comprises receiving a first message from a control plane function entity. The first message comprises one or more information elements referencing one or more pre-defined packet detection rules (PDRs) configured in the user plane function entity. The one or more pre-defined PDRs specify one or more predefined usage reporting rules (URRs). The method further comprises activating the one or more pre-defined PDRs. The method further comprises generating a usage report for at least one of the one or more predefined URRs. The usage report comprises information for describing received user traffic which is related to the at least one of the one or more predefined URRs. The method further comprises sending a second message comprising the usage report to the control plane function entity.

In an embodiment, the information for describing received user traffic which is related to the at least one of the one or more predefined URRs comprises a PDR identifier and/or at least one predefined rule name.

In an embodiment, the information describing received user traffic which is related to the at least one of the one or more predefined URRs is used for deriving a predefined policy and charging control rule in the control plane function entity.

In an embodiment, the PDR identifier is comprised in the first message.

In an embodiment, the at least one predefined rule name is comprised in the one or more information elements referencing the one or more pre-defined PDRs.

In an embodiment, a pre-defined PDR is associated with one or more predefined URRs.

In an embodiment, the one or more information elements referencing one or more pre-defined PDRs comprises one or more activate predefined rules information elements.

In an embodiment, the first message comprises at least one of a Packet Forwarding Control Protocol (PFCP) Session Establishment Request or a PFCP Session Modification Request message.

In an embodiment, the second message comprises a PFCP session report request message.

In an embodiment, a predefined rule is predefined with one or more predefined URRs.

In an embodiment, the user plane function entity comprises at least one of Packet Data Network Gateway (PGW) user plane (PGW-U) or User plane Function (UPF).

In an embodiment, the control plane function entity comprises at least one of Session Management Function (SMF), PGW control plane (PGW-C), or PGW-C combined with SMF.

In a second aspect of the disclosure, there is provided a method performed by a control plane function entity. The method comprises sending a first message to a user plane function entity. The first message comprises one or more information elements referencing one or more pre-defined packet detection rules (PDRs) configured in the user plane function entity. The one or more pre-defined PDRs specify one or more predefined usage reporting rules (URRs). The method further comprises receiving a second message comprising a usage report from the user plane function entity. The usage report is generated for at least one of the one or more predefined URRs and the usage report comprises information for describing received user traffic which is related to the at least one of the one or more predefined URRs. The method further comprises processing the usage report based on the information for describing received user traffic which is related to the at least one of the one or more predefined URRs.

In an embodiment, the information for describing received user traffic which is related to the at least one of the one or more predefined URRs comprises a PDR identifier and/or at least one predefined rule name.

In an embodiment, the information describing received user traffic which is related to the at least one of the one or more predefined URRs is used for deriving a predefined policy and charging control rule in the control plane function entity.

In an embodiment, the PDR identifier is comprised in the first message.

In an embodiment, the at least one predefined rule name is comprised in the one or more information elements referencing the one or more pre-defined PDRs.

In an embodiment, a pre-defined PDR is associated with one or more predefined URRs.

In an embodiment, the one or more information elements referencing one or more pre-defined PDRs comprises one or more activate predefined rules information elements.

In an embodiment, the first message comprises at least one of a Packet Forwarding Control Protocol (PFCP) Session Establishment Request, or a PFCP Session Modification Request message.

In an embodiment, the second message comprises a PFCP session report request message.

In an embodiment, a predefined rule is predefined with one or more predefined URRs.

In an embodiment, the user plane function entity comprises at least one of Packet Data Network Gateway (PGW) user plane (PGW-U), or User plane Function (UPF).

In an embodiment, the control plane function entity comprises at least one of Session Management Function (SMF), PGW control plane (PGW-C), or PGW-C combined with SMF.

In a third aspect of the disclosure, there is provided a user plane function entity. The user plane function entity comprises a processor and a memory coupled to the processor. Said memory contains instructions executable by said processor. Said user plane function entity is operative to receive a first message from a control plane function entity. The first message comprises one or more information elements referencing one or more pre-defined packet detection rules (PDRs) configured in the user plane function entity. The one or more pre-defined PDRs specify one or more predefined usage reporting rules (URRs). Said user plane function entity is further operative to activate the one or more pre-defined PDRs. Said user plane function entity is further operative to generate a usage report for at least one of the one or more predefined URRs. The usage report comprises information for describing received user traffic which is related to the at least one of the one or more predefined URRs. Said user plane function entity is further operative to send a second message comprising the usage report to the control plane function entity.

In a fourth aspect of the disclosure, there is provided a control plane function entity. The control plane function entity comprises a processor and a memory coupled to the processor. Said memory contains instructions executable by said processor. Said control plane function entity is operative to send a first message to a user plane function entity. The first message comprises one or more information elements referencing one or more pre-defined packet detection rules (PDRs) configured in the user plane function entity. The one or more pre-defined PDRs specify one or more predefined usage reporting rules (URRs). Said control plane function entity is further operative to receive a second message comprising a usage report from the user plane function entity. The usage report is generated for at least one of the one or more predefined URRs and the usage report comprises information for describing received user traffic which is related to the at least one of the one or more predefined URRs. Said control plane function entity is further operative to process the usage report based on the information for describing received user traffic which is related to the at least one of the one or more predefined URRs.

In a fifth aspect of the disclosure, there is provided a user plane function entity. The user plane function entity comprises a receiving module configured to receive a first message from a control plane function entity. The first message comprises one or more information elements referencing one or more pre-defined packet detection rules (PDRs) configured in the user plane function entity. The one or more pre-defined PDRs specify one or more predefined usage reporting rules (URRs). The user plane function entity further comprises an activating module configured to activate the one or more pre-defined PDRs. The user plane function entity further comprises a generating module configured to generate a usage report for at least one of the one or more predefined URRs. The usage report comprises information for describing received user traffic which is related to the at least one of the one or more predefined URRs. The user plane function entity further comprises a sending module configured to send a second message comprising the usage report to the control plane function entity.

In a sixth aspect of the disclosure, there is provided a control plane function entity. The control plane function entity comprises a sending module configured to send a first message to a user plane function entity. The first message comprises one or more information elements referencing one or more pre-defined packet detection rules (PDRs) configured in the user plane function entity. The one or more pre-defined PDRs specify one or more predefined usage reporting rules (URRs). The control plane function entity further comprises a receiving module configured to receive a second message comprising a usage report from the user plane function entity. The usage report is generated for at least one of the one or more predefined URRs and the usage report comprises information for describing received user traffic which is related to the at least one of the one or more predefined URRs. The control plane function entity further comprises a processing module configured to process the usage report based on the information for describing received user traffic which is related to the at least one of the one or more predefined URRs.

In a seventh aspect of the disclosure, there is provided a computer program product comprising instructions which when executed by at least one processor, cause the at least one processor to perform the method according to any one of the first and second aspects.

In an eighth aspect of the disclosure, there is provided a computer-readable storage medium storing instructions which when executed by at least one processor, cause the at least one processor to perform the method according to any one of the first and second aspects.

Embodiments herein may provide many advantages, of which a non-exhaustive list of examples follows. In some embodiments herein, CP function can know information for describing received user traffic which is related to the at least one of the one or more predefined URRs (such as the pre-defined PCC rule associated to the user report from UP function) in case of pre-defined PDR use cases. In some embodiments herein, based on information for describing received user traffic which is related to the at least one of the one or more predefined URRs (such as pre-defined PCC rule), CP function can perform any suitable action such as deciding the charging method online or offline and can also deciding other parameters to be enforced, e.g., usage monitoring or QoS parameters. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
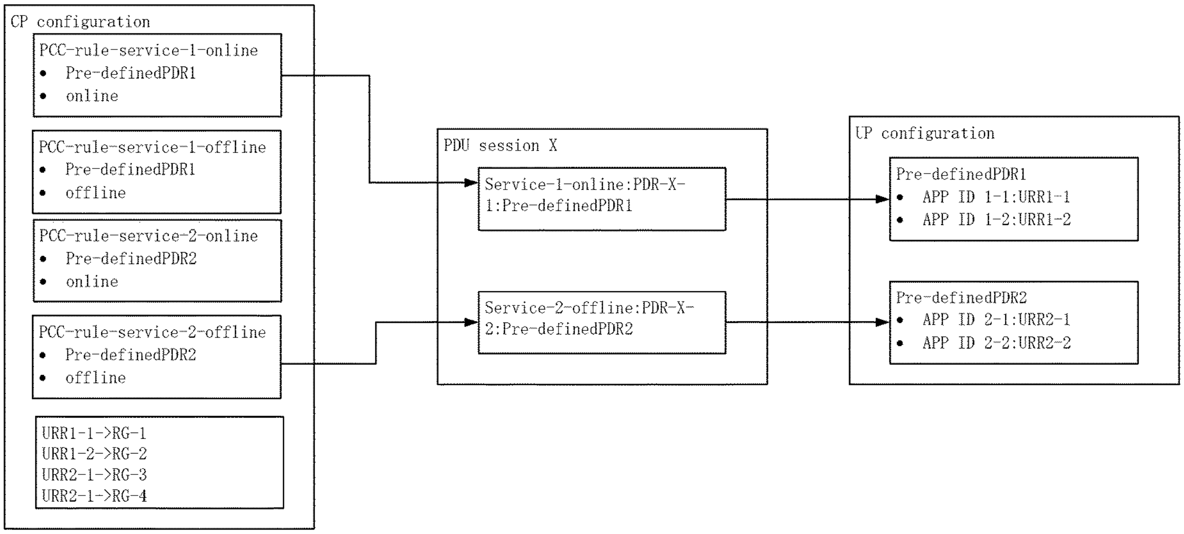
FIG. 1 shows an example of a charging mechanism.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" or "network function (NF)" refers to any suitable network entity which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN (Evolved Universal Terrestrial Radio Access Network) Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearable devices such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architectures illustrated in FIGS. 2-5. For simplicity, the system architectures of FIGS. 2-5 only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

Figure 2:
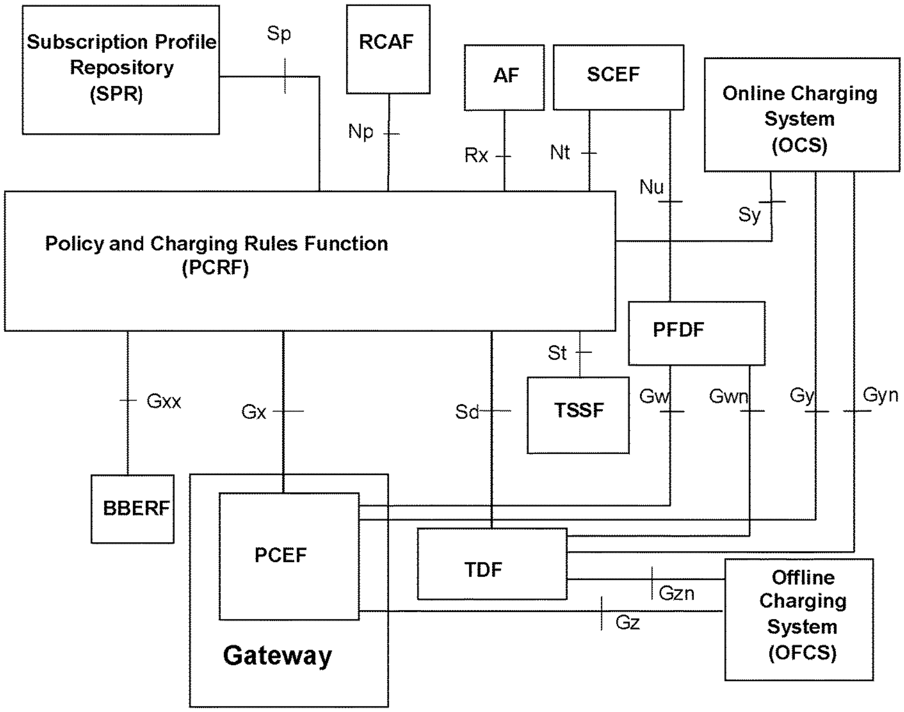
FIG. 2 schematically shows a non-roaming PCC logical architecture when SPR is used according to an embodiment of the present disclosure.
Figure 5:
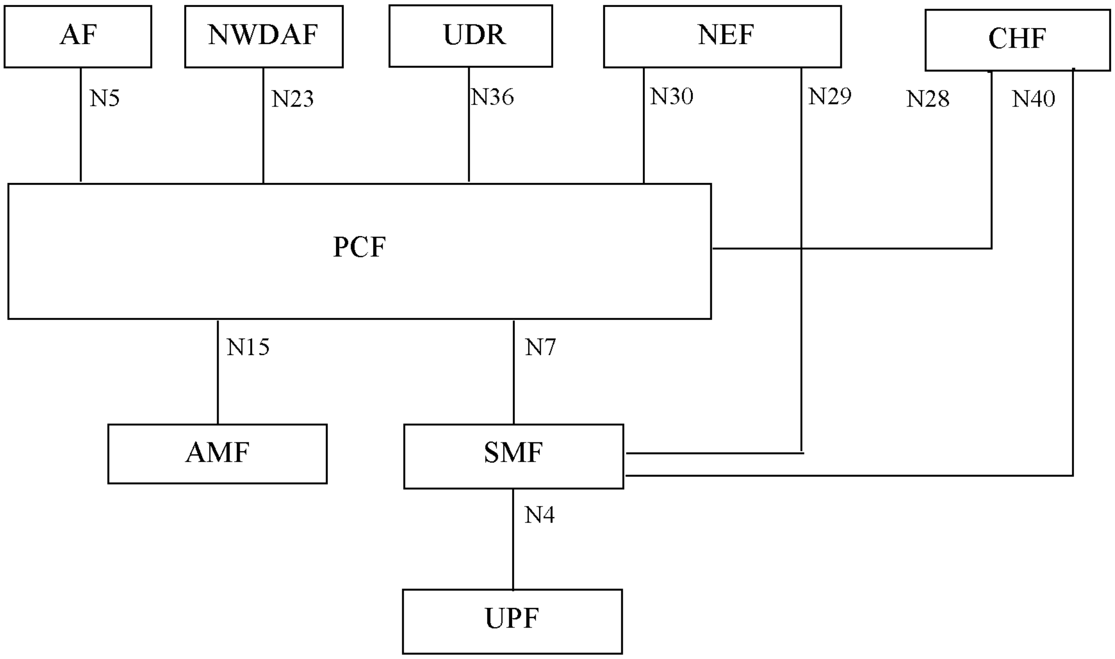
FIG. 5 schematically shows a non-roaming reference architecture of policy and charging control framework for the 5G system according to an embodiment of the present disclosure.

FIG. 2 schematically shows a non-roaming PCC logical architecture when SPR is used according to an embodiment of the present disclosure, which is the same as FIGS. 5.1-1 of 3GPP TS 23.203 V17.1.0, the disclosure of which is incorporated by reference herein in its entirety.

Figure 3:
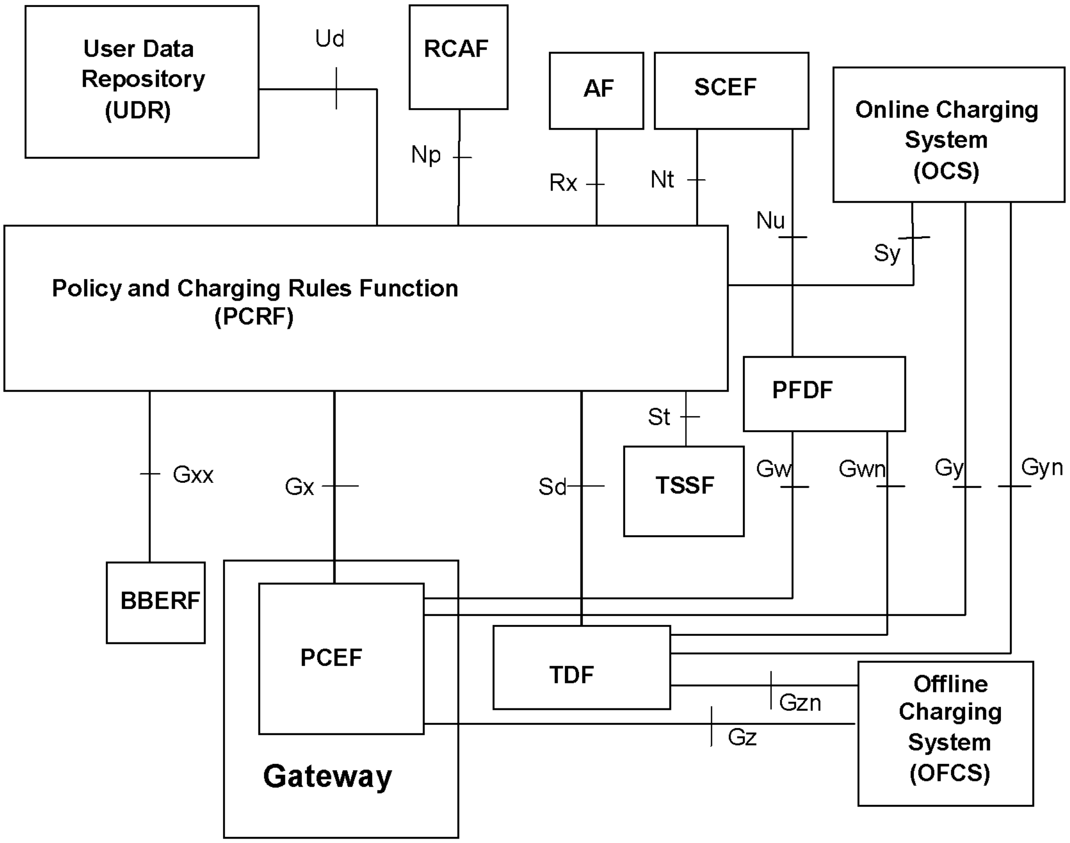
FIG. 3 schematically shows a non-roaming PCC logical architecture when UDR is used according to an embodiment of the present disclosure.

FIG. 3 schematically shows a non-roaming PCC logical architecture when UDR is used according to an embodiment of the present disclosure, which is the same as FIGS. 5.1-2 of 3GPP TS 23.203 V17.1.0.

The PCC functionality is comprised by the functions of the Policy and Charging Enforcement Function (PCEF), the Bearer Binding and Event Reporting Function (BBERF), the Policy and Charging Rules Function (PCRF), the Application Function (AF), the Traffic Detection Function (TDF), the Traffic Steering Support Function (TSSF), the Online Charging System (OCS), the Offline Charging System (OFCS) and the Subscription Profile Repository (SPR) or the User Data Repository (UDR).

The Rx reference point resides between the AF and the PCRF. The Gx reference point resides between the PCEF and the PCRF. The Sp reference point lies between the SPR and the PCRF. The Ud reference point resides between the UDR and the PCRF. The Gy reference point resides between the OCS and the PCEF. The Gz reference point resides between the PCEF and the OFCS. The Gxx reference point resides between the PCRF and the BBERF. The Sd reference point resides between the PCRF and the TDF. The Sy reference point resides between the PCRF and the OCS. The Gyn reference point resides between the OCS and the TDF. The Gzn reference point resides between the TDF and the OFCS. The Np reference point resides between the RCAF and the PCRF. The Nt reference point enables the negotiation between the SCEF and the PCRF about the recommended time window(s) and the related conditions for future background data transfer. The St reference point resides between the TSSF and the PCRF. The Nu reference point resides between the SCEF and the PFDF, and enables the 3rd party service provider to manage PFDs in the PFDF. The Gw reference point resides between the PFDF and the PCEF. The Gwn reference point resides between the PFDF and the TDF.

The network elements and reference points as shown in FIGS. 2-3 may be same as the corresponding network elements and reference points as described in 3GPP TS 23.203 V17.1.0.

Figure 4:
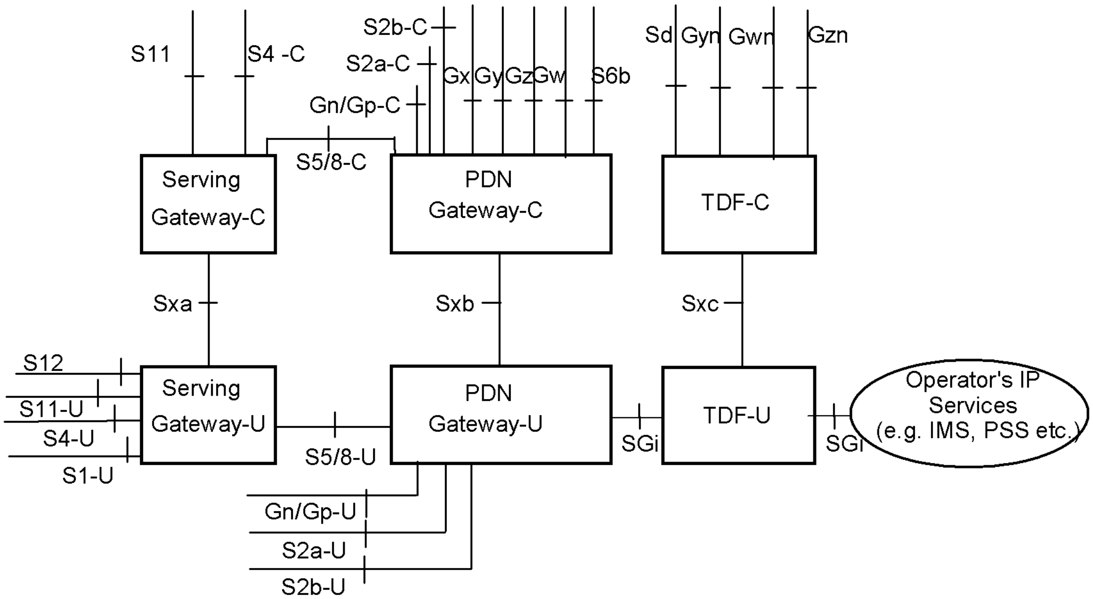
FIG. 4 schematically shows an architecture reference model with separation of user plane and control plane for non-roaming and roaming scenarios according to an embodiment of the present disclosure.

FIG. 4 schematically shows an architecture reference model with separation of user plane and control plane for non-roaming and roaming scenarios according to an embodiment of the present disclosure. The system architecture of FIG. 4 is same as the architecture reference model as described in FIG. 4.2.1-1 of 3GPP TS 23.214 V17.0.0, the disclosure of which is incorporated by reference herein in its entirety, and may comprise some exemplary network nodes such as serving gateway-C(SGW-C), serving gateway-U (SGW-U), PDN gateway-C (PGW-C), PDN gateway-U (PGW-U), TDF (traffic detection function) control plane (TDF-C) and TDF user plane (TDF-U). As further illustrated in FIG. 4, the exemplary system architecture also contains some interfaces such as Sxa. Sxb, Sxc, etc. Various network nodes shown in FIG. 4 may be responsible for functions for example as defined in 3GPP TS23.214 V17.0.0.

FIG. 5 schematically shows a non-roaming reference architecture of policy and charging control framework for the 5G system according to an embodiment of the present disclosure, which is the same as FIG. 5.2.1-1a of 3GPP TS 23.503 V17.1.0, the disclosure of which is incorporated by reference herein in its entirety.

The reference architecture of policy and charging control framework for the 5G System is comprised by the functions of the Policy Control Function (PCF), the Session Management Function (SMF), the User Plane Function (UPF), the Access and Mobility Management Function (AMF), the Network Exposure Functionality (NEF), the Network Data Analytics Function (NWDAF), the Charging Function (CHF), the Application Function (AF) and UDR (Unified Data Repository).

N5 is a reference point between AF and PCF. N23 is a reference point between NWDAF and PCF. N36 is a reference point between UDR and PCF. N30 is a reference point between NEF and PCF. N29 is a reference point between NEF and SMF. N28 is a reference point between CHF and PCF. N40 is a reference point between CHF and SMF. N15 is a reference point between PCF and AMF. N7 is a reference point between PCF and SMF. N4 is a reference point between SMF and UPF.

The PCF providing session management policy control for a UE (i.e. PCF for the PDU Session) and the PCF providing non-session management policy control for that UE (i.e. PCF for the UE) may be different PCF instances. For the case that there are different PCF instances, the PCF for the PDU Session does not support the N15 reference point while the PCF for the UE does not support the N7 reference point. The N43 reference point enables communication between the PCF for a UE and the PCF for the PDU Session.

The network elements and reference points as shown in FIG. 5 may be same as the corresponding network elements and reference points as described in 3GPP TS 23.503 V17.1.0.

Figure 6:
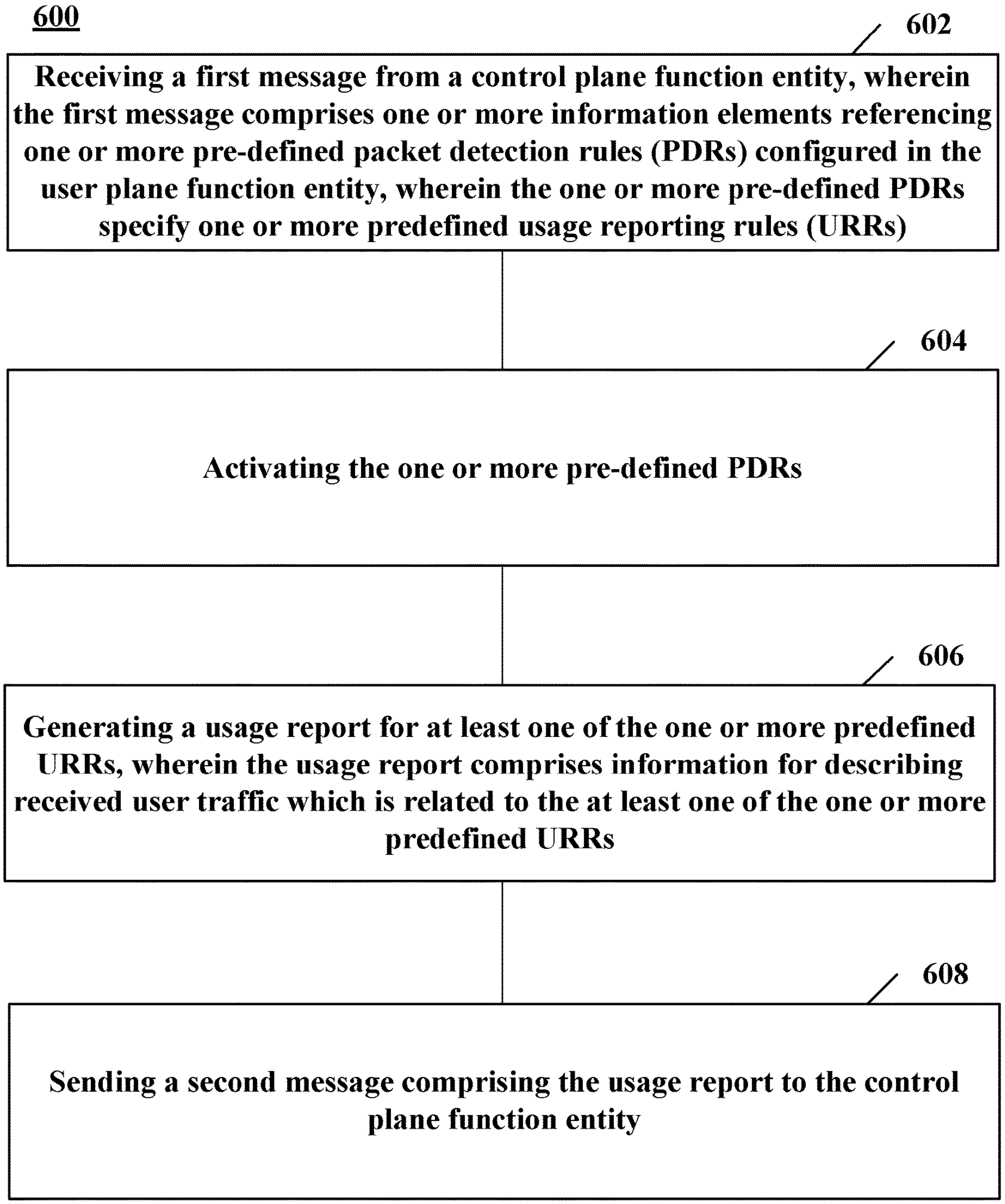
FIG. 6 shows a flowchart of a method according to an embodiment of the present disclosure.

FIG. 6 shows a flowchart of a method according to an embodiment of the present disclosure, which may be performed by an apparatus implemented in or at or as a user plane function entity or communicatively coupled to the user plane function entity. As such, the apparatus may provide means or modules for accomplishing various parts of the method 600 as well as means or modules for accomplishing other processes in conjunction with other components.

The user plane function entity may be any suitable network device or node or entity or function which can provide user plane function. In an embodiment, the user plane function entity comprises at least one of PGW-U or UPF.

At block 602, the user plane function entity may receive a first message from a control plane function entity.

The control plane function entity may be any suitable network device or node or entity or function which can provide control plane function. In an embodiment, the control plane function entity comprises at least one of Session Management Function (SMF), PGW control plane (PGW-C), or PGW-C combined with SMF.

The first message may be any suitable message which can be exchanged between the control plane function entity and the user plane function entity. In an embodiment, the first message comprises at least one of a Packet Forwarding Control Protocol (PFCP) Session Establishment Request, or a PFCP Session Modification Request message for example as described in 3GPP TS 29.244 V17.1.0.

In an embodiment, the first message comprises one or more information elements referencing one or more pre-defined packet detection rules (PDRs) configured in the user plane function entity.

In an embodiment, the one or more information elements referencing one or more pre-defined PDRs may comprise one or more activate predefined rules information elements for example one or more Activate Predefined Rules IEs in a Create PDR IE in a PFCP Session Establishment Request, or in a Create PDR IE or an Update PDR IE in a PFCP Session Modification Request message as described in 3GPP TS 29.244 V17.1.0.

In an embodiment, the Create/Update PDR IE contains the Activate Predefined Rules IE and excludes URR ID.

In an embodiment, within a Create/Update PDR IE, multiple Activate Predefined Rules IEs are included and represent multiple Predefined Rule Names and when different multiple predefined rule is predefined with different predefined URRs, these URRs are predefined in the pre-defined PDR and correspond to different measurement methods, thresholds, reporting triggers and so on (i.e. URR ID is not explicitly provisioned in URR ID IE in the Create/Update PDR IE).

In an embodiment, the one or more pre-defined PDRs specify one or more predefined usage reporting rules (URRs).

In an embodiment, a pre-defined PDR may be associated with one or more predefined URRs.

At block 604, the user plane function entity may activate the one or more pre-defined PDRs.

In an embodiment, activation and deactivation of pre-defined PDRs may be same as Activation and Deactivation of Pre-defined PDRs as described in clause 5.19 of 3GPP TS 29.244 V17.1.0.

At block 606, the user plane function entity may generate a usage report for at least one of the one or more predefined URRs. In an embodiment, the usage report comprises information for describing received user traffic which is related to the at least one of the one or more predefined URRs. The usage report may comprise any suitable information. The information for describing received user traffic which is related to the at least one of the one or more predefined URRs may comprise any suitable information which can be used to derive the detailed traffic description information related to the at least one of the one or more predefined URRs.

In an embodiment, a predefined rule may be predefined with one or more predefined URRs.

In an embodiment, the information describing received user traffic which is related to the at least one of the one or more predefined URRs is used for deriving a predefined policy and charging control rule in the control plane function entity.

In an embodiment, the information for describing received user traffic which is related to the at least one of the one or more predefined URRs comprises a PDR identifier (ID) and/or at least one predefined rule name. For example, the PDR ID may uniquely identify the PDR among all the PDRs configured for a PFCP session. The predefined rule name may be same as the Predefined Rule Name as described in 3GPP TS 29.244 V17.1.0. In an embodiment, the PDR ID may be used to directly find the predefined policy and charging control (PCC) rule. In an embodiment, the at least one predefined rule name may be used to find the at least one corresponding predefined PDR and then a predefined policy and charging control rule can be found based on the at least one corresponding predefined PDR.

In an embodiment, the PDR identifier may be comprised in the first message. The user plane function entity may obtain the PDR identifier from the first message and associate it with the URR(s) specified by the predefined PDR.

In an embodiment, the at least one predefined rule name is comprised in the one or more information elements referencing the one or more pre-defined PDRs. The user plane function entity may obtain the at least one predefined rule name from the one or more information elements referencing the one or more pre-defined PDRs and associate it with the URR(s) specified by the predefined PDR.

For example, clause 8.2.72 of 3GPP TS 29.244 V17.1.0 describes Activate Predefined Rules. The Activate Predefined Rules IE type may be coded as Table 2. The Activate Predefined Rules IE may indicate a Predefined Rules Name, referring to one or more predefined rules which need to be activated in the UP function. The Predefined Rules Name field may be encoded as an OctetString.

TABLE 2

| | Bits | | | | | | | |
|---|---|---|---|---|---|---|---|---|
| Octets | 8 | 7 | 6 | 5 | 4 | 3 | 2 | 1 |
| 1 to 2 | Type = 106 (decimal) | | | | | | | |
| 3 to 4 | Length = n | | | | | | | |
| 5 to (n + 4) | Predefined Rules Name | | | | | | | |

At block 608, the user plane function entity may send a second message comprising the usage report to the control plane function entity. The second message may be any suitable message which can be exchanged between the user plane function entity and control plane function entity.

In an embodiment, the second message may comprise a PFCP session report request message. For example, the usage report may be same as the Usage Report IE within PFCP Session Report Request as described in clause 7.5.8.3 of 3GPP TS 29.244 V17.1.0 except that it further comprises information for describing received user traffic which is related to the at least one of the one or more predefined URRs.

Figure 7:
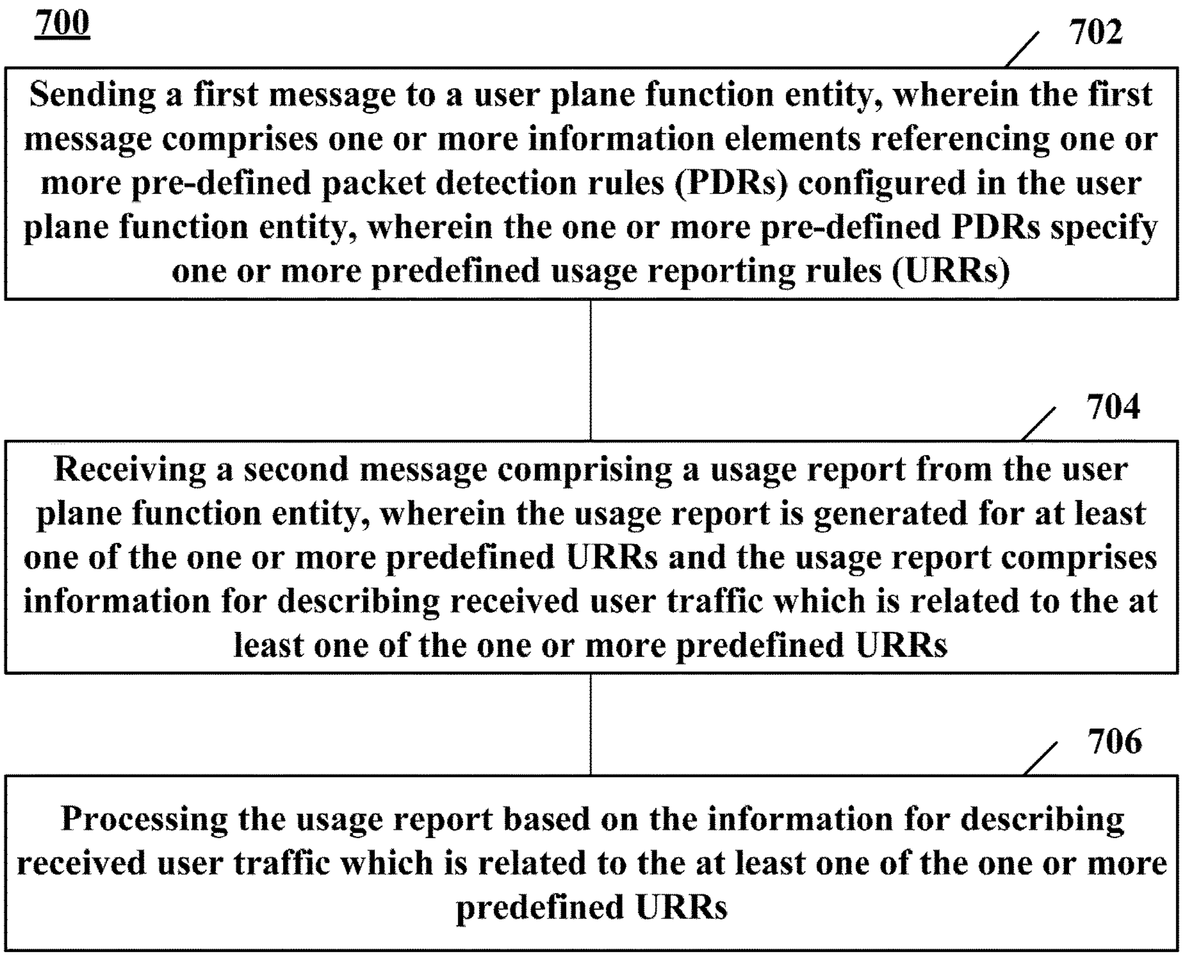
FIG. 7 shows a flowchart of a method according to another embodiment of the present disclosure.

FIG. 7 shows a flowchart of a method according to another embodiment of the present disclosure, which may be performed by an apparatus implemented in or at or as a control plane function entity or communicatively coupled to the control plane function entity. As such, the apparatus may provide means or modules for accomplishing various parts of the method 700 as well as means or modules for accomplishing other processes in conjunction with other components. For some parts which have been described in the above embodiments, the description thereof is omitted here for brevity.

At block 702, the control plane function entity may send a first message to a user plane function entity. The first message comprises one or more information elements referencing one or more pre-defined packet detection rules (PDRs) configured in the user plane function entity. The one or more pre-defined PDRs specify one or more predefined usage reporting rules (URRs)

At block 704, the control plane function entity may receive a second message comprising a usage report from the user plane function entity. The usage report is generated for at least one of the one or more predefined URRs and the usage report comprises information for describing received user traffic which is related to the at least one of the one or more predefined URRs At block 706, the control plane function entity may process the usage report based on the information for describing received user traffic which is related to the at least one of the one or more predefined URRs.

When the user plane function entity reports the usage report(s) for a pre-defined PDR which is activated by the control plane function entity using Activate Predefined Rules IE, the user plane function entity also reports the PDR ID or Predefined Rule Name. Then the control plane function entity can then identify the pre-defined PCC rule that is associated with the PDR ID or Predefined Rule Name. Based on the pre-defined PCC rule, the control plane function entity can decide whether online or offline charging method should be used for this URR. The control plane function entity can also enforce other parameters (e.g., usage monitoring, QoS parameters) associated with the pre-defined PCC rule.

Using FIG. 1 for example. When UP function reports the user report(s) URR1-1 for a traffic matching APP ID 1-1 of pre-defined PDR1, UP function also includes the PDR ID "PDR-X-1" or Predefined Rule Name "Pre-defined PDR1" in the usage report. Then based on PDR ID "PDR-X-1" or Predefined Rule Name "Pre-defined PDR1", CP function knows that pre-defined PCC rule "service-1-online" is associated with the usage report. Then CP function knows that online must be used for this URR1-1, because the PCC rule "service-1-online" has been configured with online charging method.

In an embodiment, 3GPP TS 29.244 V17.1.0 may be amended as following.

7.5.8.3 Usage Report IE within PFCP Session Report Request

The Usage Report grouped IE shall be encoded as shown in Table 7.5.8.3-1.

TABLE 7.5.8.3-1

Usage Report IE within PFCP Session Report Request
Octet 1 and 2 Usage Report IE Type = 80 (decimal)
Octets 3 and 4 Length = n

| Information elements | P | Condition/Comment | Appl. Sxa | Sxb | Sxc | N4 | IE Type |
|---|---|---|---|---|---|---|---|
| URR ID | M | This IE shall identify the URR for which usage is reported. | X | X | X | X | URR ID |
| UR-SEQN | M | This IE shall uniquely identify the Usage Report for the URR (see clause 5.2.2.3). | X | X | X | X | UR-SEQN |
| Usage Report Trigger | M | This IE shall identify the trigger for this report. | X | X | X | X | Usage Report Trigger |
| Start Time | C | This IE shall be present, except if the Usage Report Trigger indicates 'Start of Traffic', 'Stop of Traffic' or 'MAC Addresses Reporting'. When present, this IE shall provide the timestamp when the collection of the information in this report was started. | X | X | X | X | Start Time |
| End Time | C | This IE shall be present, except if the Usage Report Trigger indicates 'Start of Traffic', 'Stop of Traffic' or 'MAC Addresses Reporting'. When present, this IE shall provide the timestamp when the collection of the information in this report was generated. | X | X | X | X | End Time |
| Volume Measurement | C | This IE shall be present if a volume measurement needs to be reported. (NOTE 2) | X | X | X | X | Volume Measurement |
| Duration Measurement | C | This IE shall be present if a duration measurement needs to be reported. (NOTE 2) | X | X | X | X | Duration Measurement |
| Application Detection Information | C | This IE shall be present if application detection information needs to be reported. | — | X | X | X | Application Detection Information |
| UE IP address | C | This IE shall be present if the start or stop of an application has been detected and no UE IP address was provisioned in the PDI. See NOTE 1. | — | — | X | X | UE IP address |
| Network Instance | C | This IE shall be present if the start or stop of an application has been detected, no UE IP address was provisioned in the PDI | — | — | X | X | Network Instance |

TABLE 7.5.8.3-1-continued

Usage Report IE within PFCP Session Report Request
Octet 1 and 2 Usage Report IE Type = 80 (decimal)
Octets 3 and 4 Length = n

| Information elements | P | Condition/Comment | Appl. Sxa | Sxb | Sxc | N4 | IE Type |
|---|---|---|---|---|---|---|---|
| | | and multiple PDNs with overlapping IP addresses are used in the UP function. See NOTE 1. | | | | | |
| Time of First Packet | C | This IE shall be present if available for this URR. | — | X | X | X | Time of First Packet |
| Time of Last Packet | C | This IE shall be present if available for this URR. | — | X | X | X | Time of Last Packet |
| Usage Information | C | This IE shall be present if the UP function reports Usage Reports before and after a Monitoring Time, or before and after QoS enforcement. When present, it shall indicate whether the usage is reported for the period before or after that time, or before or after QoS enforcement. | X | X | X | X | Usage Information |
| Query URR Reference | C | This IE shall be present if this usage report is sent as a result of a query URR received in a PFCP Session Modification Request and the Query URR Reference IE was present in the PFCP Session Modification Request. When present, it shall be set to the Query URR Reference value received in the PFCP Session Modification Request. | X | X | X | X | Query URR Reference |
| Event Time Stamp | C | This IE shall be present, if the report is related to an event. When present, it shall be set to the time when the event occurs. Several IEs with the same IE type may be present to report multiple occurrences for an event for this URR ID. | — | X | X | X | Time Stamp |
| Ethernet Traffic Information | C | This IE shall be present if Ethernet Traffic Information needs to be reported. See Table 7.5.8.3-3. | — | — | — | X | Ethernet Traffic Information |
| Join IP Muticast Information | C | This IE shall be present if the UPF needs to report that it has added the PDU session to the DL replication tree of a new IP multicast flow. Several IEs with the same IE type may be present to report multiple IP multicast flows added to the PDU session. | — | — | — | X | Join IP Multicast Information |
| Leave IP Muticast Information | C | This IE shall be present if the UPF needs to report that it has removed the PDU session from the DL replication tree of an IP multicast flow. Several IEs with the same IE type may be present to report multiple IP multicast flows removed from the PDU session. | — | — | — | X | Leave IP Multicast Information |
| Predefined Rule Name | O | This IE may be present to identify a predefined rule if the usage report is generated for a predefined URR which was activated via an Activate Predefined Rules IE in a Create PDR IE or an Update PDR IE. (NOTE x). Several IEs with the same IE type may be present to represent multiple Predefined Rules with which the URR is associated . . . | — | X | — | X | Predefined Rule Name |

NOTE 1:
This is the case for unsolicited application reporting by the TDF. The Network instance is required when the UE IP address cannot be used to determine the corresponding PDN connection.
(NOTE 2):
The UP function may send a Usage Report with the Volume/Duration Measurement set to zero.
(NOTE X):
It is assumed the predefined rule(s) identified by the predefined rule name(s) can be only associated with a predefined URR.

TABLE 7.5.8.3-2

Application Detection Information IE within Usage Report IE
Octet 1 and 2 Application Detection Information IE Type = 68 (decimal)
Octets 3 and 4 Length = n

| Information elements | P | Condition/Comment | Appl. Sxa | Sxb | Sxc | N4 | IE Type |
|---|---|---|---|---|---|---|---|
| Application ID | M | This IE shall identify the Application ID for which a start or stop of traffic is reported. | — | X | X | X | Application ID |
| Application Instance ID | C | When present, this IE shall identify the Application Instance Identifier for which a start or stop of traffic is reported. It shall be present, when reporting the start of an application, if the Reduced Application Detection Information flag was not set in the Measurement Information and if the flow information for the detected application is deducible. It shall be present, when reporting the stop of an application, if the Reduced Application Detection Information flag was not set in the Measurement | — | X | X | X | Application Instance ID |

TABLE 7.5.8.3-2-continued

| Application Detection Information IE within Usage Report IE<br>Octet 1 and 2 Application Detection Information IE Type = 68 (decimal)<br>Octets 3 and 4 Length = n | | | | | | | |
|---|---|---|---|---|---|---|---|
| Information | | | Appl. | | | | |
| elements | P | Condition/Comment | Sxa | Sxb | Sxc | N4 | IE Type |
| | | Information and if it was provided when reporting the start of the application. | | | | | |
| Flow Information | C | When present, this IE shall contain the flow information for the detected application. It shall be present, when reporting the start of an application, if the Reduced Application Detection Information flag was not set in the Measurement Information and if the flow information for the detected application is deducible. | — | X | X | X | Flow Information |
| PDR ID | O | When present, it shall contain the PDR ID which the application traffic matches. | — | X | X | X | PDR ID |

TABLE 7.5.8.3-3

| Ethernet Traffic Information IE within Usage Report IE<br>Octet 1 and 2 Ethernet Traffic Information IE Type = 143 (decimal)<br>Octets 3 and 4 Length = n | | | | | | | |
|---|---|---|---|---|---|---|---|
| Information | | | Appl. | | | | |
| elements | P | Condition/Comment | Sxa | Sxb | Sxc | N4 | IE Type |
| MAC Addresses Detected | C | This IE shall be present if one or more new MAC addresses have been detected.<br>When present, it shall identify the MAC (Ethernet) addresses newly detected as source address of frames sent UL by the UE.<br>Several IEs with the same IE type may be present to to provision multiple lists of MAC addresses (e.g. with different V-LAN tags). | — | — | — | X | MAC Addresses Detected |
| MAC Addresses Removed | C | This IE shall be present if one or more new MAC addresses have been removed.<br>When present, it shall identify the MAC (Ethernet) addresses that have been inactive for a duration exceeding the Ethernet inactivity Timer.<br>Several IEs with the same IE type may be present to to provision multiple lists of MAC addresses (e.g. with different V-LAN tags). | — | — | — | X | MAC Addresses Removed |

TABLE 7.5.8.3-4

| Join IP Multicast Information IE within Usage Report IE<br>Octet 1 and 2 Join IP Multicast Information IE Type = 189 (decimal)<br>Octets 3 and 4 Length = n | | | | | | | |
|---|---|---|---|---|---|---|---|
| Information | | | Appl. | | | | |
| elements | P | Condition/Comment | Sxa | Sxb | Sxc | N4 | IE Type |
| IP Multicast Address | M | This IE shall contain the IP multicast address of the DL multicast flow added to the PDU session. | — | — | — | X | IP Multicast Address |
| Source IP Address | C | This IE shall contain the source specific IP address of the DL multicast flow added to the PDU session, if available.<br>Several IEs with the same IE type may be present to represent multiple source specific addresses. | — | — | — | X | Source IP Address |

TABLE 7.5.8.3-5

| Leave IP Multicast Information IE within Usage Report IE<br>Octet 1 and 2 Leave IP Multicast Information IE Type = 190 (decimal)<br>Octets 3 and 4 Length = n | | | | | | | |
|---|---|---|---|---|---|---|---|
| Information | | | Appl. | | | | |
| elements | P | Condition/Comment | Sxa | Sxb | Sxc | N4 | IE Type |
| IP Multicast Address | M | This IE shall contain the IP multicast address of the DL multicast flow removed from the PDU session. | — | — | — | X | IP Multicast Address |
| Source IP Address | C | This IE shall contain the source specific IP address of the DL multicast flow removed from the PDU session, if available. Several IEs with the same IE type may be present to represent multiple source specific addresses. | — | — | — | X | Source IP Address |

8.1.2 Information Element Types

A PFCP message may contain several IEs. In order to have forward compatible type definitions for the PFCP IEs, all of them shall be TLV (Type, Length, Value) coded. PFCP IE type values are specified in the Table 8.1.2-1.

The 3rd column of this table specifies if the IE is either Extendable or has a variable length or a fixed length and a reference to the clause where the IE is specified:

Fixed Length: the IE has a fixed set of fields, and a fixed number of octets;

Variable Length: the IE has a fixed set of fields, and has a variable number of octets. For example, the last octets may be numbered similar to "5 to (n+4)". In this example, if the value of the length field, n, is 0, then the last field is not present;

Extendable: the IE has a variable number of fields, and has a variable number of octets. The last fields are typically specified with the statement: "These octet(s) is/are present only if explicitly specified". The legacy receiving entity shall ignore the unknown octets.

The 4th column of this table indicates the number of fixed Octets the IE contained when the IE was first defined in the specification, which shall be an integer value reflecting the minimum length of fixed octets defined for the IE.

An IE of any of the above types may have a null length as specified in clause 5.6.3. This shall not be considered as an error by the receiving PFCP entity.

In order to improve the efficiency of troubleshooting, it is recommended that the IEs should be arranged in the signalling messages as well as in the grouped IEs, according to the order the IEs are listed in the message definition table or grouped IE definition table in clause 7. However the receiving entity shall be prepared to handle the messages with IEs in any order.

Within IEs, certain fields may be described as spare. These bits shall be transmitted with the value set to "0". To allow for future features, the receiver shall not evaluate these bits.

TABLE 8.1.2-1

| Information Element Types | | | |
|---|---|---|---|
| IE Type value (Decimal) | Information elements | Comment/Reference | Number of Fixed Octets |
| 0 | Reserved | | |
| 1 | Create PDR | Extendable/Table 7.5.2.2-1 | Not Applicable |
| 2 | PDI | Extendable/Table 7.5.2.2-2 | Not Applicable |
| 3 | Create FAR | Extendable/Table 7.5.2.3-1 | Not Applicable |
| 4 | Forwarding Parameters | Extendable/Table 7.5.2.3-2 | Not Applicable |
| 5 | Duplicating Parameters | Extendable/Table 7.5.2.3-3 | Not Applicable |
| 6 | Create URR | Extendable/Table 7.5.2.4-1 | Not Applicable |
| 7 | Create QER | Extendable/Table 7.5.2.5-1 | Not Applicable |
| 8 | Created PDR | Extendable/Table 7.5.3.2-1 | Not Applicable |
| 9 | Update PDR | Extendable/Table 7.5.4.2-1 | Not Applicable |
| 10 | Update FAR | Extendable/Table 7.5.4.3-1 | Not Applicable |
| 11 | Update Forwarding Parameters | Extendable/Table 7.5.4.3-2 | Not Applicable |
| 12 | Update BAR (PFCP Session Report Response) | Extendable/Table 7.5.9.2-1 | Not Applicable |
| 13 | Update URR | Extendable/Table 7.5.4.4 | Not Applicable |
| 14 | Update QER | Extendable/Table 7.5.4.5 | Not Applicable |
| 15 | Remove PDR | Extendable/Table 7.5.4.6 | Not Applicable |
| 16 | Remove FAR | Extendable/Table 7.5.4.7 | Not Applicable |
| 17 | Remove URR | Extendable/Table 7.5.4.8 | Not Applicable |
| 18 | Remove QER | Extendable/Table 7.5.4.9 | Not Applicable |
| 19 | Cause | Fixed/Clause 8.2.1 | 1 |
| 20 | Source Interface | Extendable/Clause 8.2.2 | 1 |
| 21 | F-TEID | Extendable/Clause 8.2.3 | 1 |
| 22 | Network Instance | Variable Length/Clause 8.2.4 | Not Applicable |
| 23 | SDF Filter | Extendable/Clause 8.2.5 | 2 |
| 24 | Application ID | Variable Length/Clause 8.2.6 | Not Applicable |
| 25 | Gate Status | Extendable/Clause 8.2.7 | 1 |
| 26 | MBR | Extendable/Clause 8.2.8 | 10 |

TABLE 8.1.2-1-continued

| Information Element Types | | | |
|---|---|---|---|
| IE Type value (Decimal) | Information elements | Comment/Reference | Number of Fixed Octets |
| 27 | GBR | Extendable/Clause 8.2.9 | 10 |
| 28 | QER Correlation ID | Extendable/Clause 8.2.10 | 4 |
| 29 | Precedence | Extendable/Clause 8.2.11 | 4 |
| 30 | Transport Level Marking | Extendable/Clause 8.2.12 | 2 |
| 31 | Volume Threshold | Extendable/Clause 8.2.13 | 1 |
| 32 | Time Threshold | Extendable/Clause 8.2.14 | 4 |
| 33 | Monitoring Time | Extendable/Clause 8.2.15 | 4 |
| 34 | Subsequent Volume Threshold | Extendable/Clause 8.2.16 | 1 |
| 35 | Subsequent Time Threshold | Extendable/Clause 8.2.17 | 4 |
| 36 | Inactivity Detection Time | Extendable/Clause 8.2.18 | 4 |
| 37 | Reporting Triggers | Extendable/Clause 8.2.19 | 2 |
| 38 | Redirect Information | Extendable/Clause 8.2.20 | 3 |
| 39 | Report Type | Extendable/Clause 8.2.21 | 1 |
| 40 | Offending IE | Fixed/Clause 8.2.22 | 2 |
| 41 | Forwarding Policy | Extendable/Clause 8.2.23 | 1 |
| 42 | Destination Interface | Extendable/Clause 8.2.24 | 1 |
| 43 | UP Function Features | Extendable/Clause 8.2.25 | 1 |
| 44 | Apply Action | Extendable/Clause 8.2.26 | 1 |
| 45 | Downlink Data Service Information | Extendable/Clause 8.2.27 | 1 |
| 46 | Downlink Data Notification Delay | Extendable/Clause 8.2.28 | 1 |
| 47 | DL Buffering Duration | Extendable/Clause 8.2.29 | 1 |
| 48 | DL Buffering Suggested Packet Count | Variable/Clause 8.2.30 | Not Applicable |
| 49 | PFCPSMReq-Flags | Extendable/Clause 8.2.31 | 1 |
| 50 | PFCPSRRsp-Flags | Extendable/Clause 8.2.32 | 1 |
| 51 | Load Control Information | Extendable/Table 7.5.3.3-1 | Not Applicable |
| 52 | Sequence Number | Fixed Length/Clause 8.2.33 | 4 |
| 53 | Metric | Fixed Length/Clause 8.2.34 | 1 |
| 54 | Overload Control Information | Extendable/Table 7.5.3.4-1 | Not Applicable |
| 55 | Timer | Extendable/Clause 8.2 35 | 1 |
| 56 | PDR ID | Extendable/Clause 8.2 36 | 2 |
| 57 | F-SEID | Extendable/Clause 8.2 37 | 9 |
| 58 | Application ID's PFDs | Extendable/Table 7.4.3.1-2 | Not Applicable |
| 59 | PFD context | Extendable/Table 7.4.3.1-3 | Not Applicable |
| 60 | Node ID | Extendable/Clause 8.2.38 | 1 |
| 61 | PFD contents | Extendable/Clause 8.2.39 | 2 |
| 62 | Measurement Method | Extendable/Clause 8.2.40 | 1 |
| 63 | Usage Report Trigger | Extendable/Clause 8.2.41 | 2 |
| 64 | Measurement Period | Extendable/Clause 8.2.42 | 4 |
| 65 | FQ-CSID | Extendable/Clause 8.2.43 | 1 |
| 66 | Volume Measurement | Extendable/Clause 8.2.44 | 1 |
| 67 | Duration Measurement | Extendable/Clause 8.2.45 | 4 |
| 68 | Application Detection Information | Extendable/Table 7.5.8.3-2 | Not Applicable |
| 69 | Time of First Packet | Extendable/Clause 8.2.46 | 4 |
| 70 | Time of Last Packet | Extendable/Clause 8.2.47 | 4 |
| 71 | Quota Holding Time | Extendable/Clause 8.2.48 | 4 |
| 72 | Dropped DL Traffic Threshold | Extendable/Clause 8.2.49 | 1 |
| 73 | Volume Quota | Extendable/Clause 8.2.50 | 1 |
| 74 | Time Quota | Extendable/Clause 8.2.51 | 4 |
| 75 | Start Time | Extendable/Clause 8.2.52 | 4 |
| 76 | End Time | Extendable/Clause 8.2.53 | 4 |
| 77 | Query URR | Extendable/Table 7.5.4.10-1 | Not Applicable |
| 78 | Usage Report (Session Modification Response) | Extendable/Table 7.5.5.2-1 | Not Applicable |
| 79 | Usage Report (Session Deletion Response) | Extendable/Table 7.5.7.2-1 | Not Applicable |
| 80 | Usage Report (Session Report Request) | Extendable/Table 7.5.8.3-1 | Not Applicable |
| 81 | URR ID | Extendable/Clause 8.2.54 | 4 |
| 82 | Linked URR ID | Extendable/Clause 8.2.55 | 4 |
| 83 | Downlink Data Report | Extendable/Table 7.5.8.2-1 | Not Applicable |
| 84 | Outer Header Creation | Extendable/Clause 8.2.56 | 2 |
| 85 | Create BAR | Extendable/Table 7.5.2.6-1 | Not Applicable |
| 86 | Update BAR (Session Modification Request) | Extendable/Table 7.5.4.11-1 | Not Applicable |
| 87 | Remove BAR | Extendable/Table 7.5.4.12-1 | Not Applicable |
| 88 | BAR ID | Extendable/Clause 8.2.57 | 1 |
| 89 | CP Function Features | Extendable/Clause 8.2.58 | 1 |
| 90 | Usage Information | Extendable/Clause 8.2.59 | 1 |

TABLE 8.1.2-1-continued

| Information Element Types | | | |
|---|---|---|---|
| IE Type value (Decimal) | Information elements | Comment/Reference | Number of Fixed Octets |
| 91 | Application Instance ID | Variable Length/Clause 8.2.60 | Not Applicable |
| 92 | Flow Information | Extendable/Clause 8.2.61 | 3 |
| 93 | UE IP Address | Extendable/Clause 8.2.62 | 1 |
| 94 | Packet Rate | Extendable/Clause 8.2.63 | 1 |
| 95 | Outer Header Removal | Extendable/Clause 8.2.64 | 1 |
| 96 | Recovery Time Stamp | Extendable/Clause 8.2.65 | 4 |
| 97 | DL Flow Level Marking | Extendable/Clause 8.2.66 | 1 |
| 98 | Header Enrichment | Extendable/Clause 8.2.67 | 1 |
| 99 | Error Indication Report | Extendable/Table 7.5.8.4-1 | Not Applicable |
| 100 | Measurement Information | Extendable/Clause 8.2.68 | 1 |
| 101 | Node Report Type | Extendable/Clause 8.2.69 | 1 |
| 102 | User Plane Path Failure Report | Extendable/Table 7.4.5.1.2-1 | Not Applicable |
| 103 | Remote GTP-U Peer | Extendable/Clause 8.2.70 | 1 |
| 104 | UR-SEQN | Fixed Length/Clause 8.2.71 | 4 |
| 105 | Update Duplicating Parameters | Extendable/Table 7.5.4.3-3 | Not Applicable |
| 106 | Activate Predefined Rules | Variable Length/Clause 8.2.72 | Not Applicable |
| 107 | Deactivate Predefined Rules | Variable Length/Clause 8.2.73 | Not Applicable |
| 108 | FAR ID | Extendable/Clause 8.2.74 | 4 |
| 109 | QER ID | Extendable/Clause 8.2.75 | 4 |
| 110 | OCI Flags | Extendable/Clause 8.2.76 | 1 |
| 111 | PFCP Association Release Request | Extendable/Clause 8.2.77 | 1 |
| 112 | Graceful Release Period | Extendable/Clause 8.2.78 | 1 |
| 113 | PDN Type | Extendable/Clause 8.2.79 | 1 |
| 114 | Failed Rule ID | Extendable/Clause 8.2.80 | 1 |
| 115 | Time Quota Mechanism | Extendable/Clause 8.2.81 | 1 |
| 116 | Reserved | | |
| 117 | User Plane Inactivity Timer | Extendable /Clause 8.2.83 | 4 |
| 118 | Aggregated URRs | Extendable/Table 7.5.2.4-2 | Not Applicable |
| 119 | Multiplier | Fixed/Clause 8.2.84 | 12 |
| 120 | Aggregated URR ID | Fixed/Clause 8.2.85 | 4 |
| 121 | Subsequent Volume Quota | Extendable/Clause 8.2.86 | 1 |
| 122 | Subsequent Time Quota | Extendable/Clause 8.2.87 | 4 |
| 123 | RQI | Extendable/Clause 8.2.88 | 1 |
| 124 | QFI | Extendable/Clause 8.2.89 | 1 |
| 125 | Query URR Reference | Extendable/Clause 8.2.90 | 4 |
| 126 | Additional Usage Reports Information | Extendable/Clause 8.2.91 | 2 |
| 127 | Create Traffic Endpoint | Extendable/Table 7.5.2.7 | Not Applicable |
| 128 | Created Traffic Endpoint | Extendable/Table 7.5.3.5 | Not Applicable |
| 129 | Update Traffic Endpoint | Extendable/Table 7.5.4.13 | Not Applicable |
| 130 | Remove Traffic Endpoint | Extendable/Table 7.5.4.14 | Not Applicable |
| 131 | Traffic Endpoint ID | Extendable/Clause 8.2.92 | 1 |
| 132 | Ethernet Packet Filter | Extendable/Table 7.5.2.2-3 | Not Applicable |
| 133 | MAC address | Extendable/Clause 8.2.93 | 1 |
| 134 | C-TAG | Extendable/Clause 8.2.94 | 3 |
| 135 | S-TAG | Extendable/Clause 8.2.95 | 3 |
| 136 | Ethertype | Extendable/Clause 8.2.96 | 2 |
| 137 | Proxying | Extendable/Clause 8.2.97 | 1 |
| 138 | Ethernet Filter ID | Extendable/Clause 8.2.98 | 4 |
| 139 | Ethernet Filter Properties | Extendable/Clause 8.2.99 | 1 |
| 140 | Suggested Buffering Packets Count | Extendable/Clause 8.2.100 | 1 |
| 141 | User ID | Extendable/Clause 8.2.101 | 1 |
| 142 | Ethernet PDU Session Information | Extendable/Clause 8.2.102 | 1 |
| 143 | Ethernet Traffic Information | Extendable/Table 7.5.8.3-3 | Not Applicable |
| 144 | MAC Addresses Detected | Extendable/Clause 8.2.103 | 7 |
| 145 | MAC Addresses Removed | Extendable/Clause 8.2.104 | 7 |
| 146 | Ethernet Inactivity Timer | Extendable/Clause 8.2.105 | 4 |
| 147 | Additional Monitoring Time | Extendable/Table 7.5.2.4-3 | Not Applicable |
| 148 | Event Quota | Extendable/Clause 8.2.112 | 4 |

TABLE 8.1.2-1-continued

Information Element Types

| IE Type value (Decimal) | Information elements | Comment/Reference | Number of Fixed Octets |
|---|---|---|---|
| 149 | Event Threshold | Extendable/Clause 8.2.113 | 4 |
| 150 | Subsequent Event Quota | Extendable/Clause 8.2.106 | 4 |
| 151 | Subsequent Event Threshold | Extendable/Clause 8.2.107 | 4 |
| 152 | Trace Information | Extendable/Clause 8.2.108 | 7 |
| 153 | Framed-Route | Variable Length/Clause 8.2.109 | Not Applicable |
| 154 | Framed-Routing | Fixed Length/Clause 8.2.110 | 4 |
| 155 | Framed-IPv6-Route | Variable Length/Clause 8.2.111 | Not Applicable |
| 156 | Time Stamp | Extendable/Clause 8.2.114 | 4 |
| 157 | Averaging Window | Extendable /Clause 8.2.115 | 4 |
| 158 | Paging Policy Indicator | Extendable/Clause 8.2.116 | 1 |
| 159 | APN/DNN | Variable Length/Clause 8.2.117 | Not Applicable |
| 160 | 3GPP Interface Type | Extendable/Clause 8.2.118 | 1 |
| 161 | PFCPSRReq-Flags | Extendable/Clause 8.2.119 | 1 |
| 162 | PFCPAUReq-Flags | Extendable/Clause 8.2.120 | 1 |
| 163 | Activation Time | Extendable/Clause 8.2.121 | 4 |
| 164 | Deactivation Time | Extendable/Clause 8.2.122 | 4 |
| 165 | Create MAR | Extendable/Table 7.5.2.8-1 | Not Applicable |
| 166 | 3GPP Access Forwarding Action Information | Extendable/Table 7.5.2.8-2 | Not Applicable |
| 167 | Non-3GPP Access Forwarding Action Information | Extendable/Table 7.5.2.8-3 | Not Applicable |
| 168 | Remove MAR | Extendable/Table 7.5.4.15-1 | Not Applicable |
| 169 | Update MAR | Extendable/Table 7.5.4.16-1 | Not Applicable |
| 170 | MAR ID | Extendable/Clause 8.2.123 | 2 |
| 171 | Steering Functionality | Extendable/Clause 8.2.124 | 1 |
| 172 | Steering Mode | Extendable/Clause 8.2.125 | 1 |
| 173 | Weight | Fixed/Clause 8.2.126 | 1 |
| 174 | Priority | Extendable/Clause 8.2.127 | 1 |
| 175 | Update 3GPP Access Forwarding Action Information | Extendable/Table 7.5.4.16-2 | Not Applicable |
| 176 | Update Non 3GPP Access Forwarding Action Information | Extendable/Table 7.5.4.16-3 | Not Applicable |
| 177 | UE IP address Pool Identity | Extendable/Clause 8.2.128 | 2 |
| 178 | Alternative SMF IP Address | Extendable/Clause 8.2.129 | 1 |
| 179 | Packet Replication and Detection Carry-On Information | Extendable/Clause 8.2.130 | 1 |
| 180 | SMF Set ID | Extendable/Clause 8.2.131 | Not applicable |
| 181 | Quota Validity Time | Extendable/Clause 8.2.132 | 4 |
| 182 | Number of Reports | Fixed/Clause 8.2.133 | 2 |
| 183 | PFCP Session Retention Information (within PFCP Association Setup Request) | Extendable/Table 7.4.4.1-2 | 1 |
| 184 | PFCPASRsp-Flags | Extendable/Clause 8.2.134 | 1 |
| 185 | CP PFCP Entity IP Address | Extendable/Clause 8.2.135 | 1 |
| 186 | PFCPSEReq-Flags | Extendable/Clause 8.2.136 | 1 |
| 187 | User Plane Path Recovery Report | Extendable/Table 7.4.5.1.3-1 | Not Applicable |
| 188 | IP Multicast Addressing Info within PFCP Session Establishment Request | Extendable/Clause 7.5.2.2-4 | Not Applicable |
| 189 | Join IP Multicast Information IE within Usage Report | Extendable/Table 7.5.8.3-4 | Not Applicable |
| 190 | Leave IP Multicast Information IE within Usage Report | Extendable/Table 7.5.8.3-5 | Not Applicable |
| 191 | IP Multicast Address | Extendable/Clause 8.2.137 | 1 |
| 192 | Source IP Address | Extendable/Clause 8.2.138 | 1 |
| 193 | Packet Rate Status | Extendable/Clause 8.2.139 | 1 |
| 194 | Create Bridge Info for TSC | Extendable/Clause 8.2.140 | 1 |
| 195 | Created Bridge Info for TSC | Extendable/Table 7.5.3.6-1 | Not Applicable |
| 196 | DS-TT Port Number | Fixed Length/Clause 8.2.141 | 4 |
| 197 | NW-TT Port Number | Fixed Length/Clause 8.2.142 | 4 |
| 198 | TSN Bridge ID | Extendable/Clause 8.2.143 | 1 |

TABLE 8.1.2-1-continued

Information Element Types

| IE Type value (Decimal) | Information elements | Comment/Reference | Number of Fixed Octets |
|---|---|---|---|
| 199 | TSC Management Information IE within PFCP Session Modification Request | Extendable/Table 7.5.4.18-1 | Not Applicable |
| 200 | TSC Management Information IE within PFCP Session Modification Response | Extendable/Table 7.5.5.3-1 | Not Applicable |
| 201 | TSC Management Information IE within PFCP Session Report Request | Extendable/Table 7.5.8.5-1 | Not Applicable |
| 202 | Port Management Information Container | Variable Length/Clause 8.2.144 | Not Applicable |
| 203 | Clock Drift Control Information | Extendable/Table 7.4.4.1.2-1 | Not Applicable |
| 204 | Requested Clock Drift Information | Extendable/Clause 8.2.145 | 1 |
| 205 | Clock Drift Report | Extendable/Table 7.4.5.1.4-1 | Not Applicable |
| 206 | TSN Time Domain Number | Extendable/Clause 8.2.146 | 1 |
| 207 | Time Offset Threshold | Extendable/Clause 8.2.147 | 8 |
| 208 | Cumulative rateRatio Threshold | Extendable/Clause 8.2.148 | 4 |
| 209 | Time Offset Measurement | Extendable/Clause 8.2.149 | 8 |
| 210 | Cumulative rateRatio Measurement | Extendable/Clause 8.2.150 | 4 |
| 211 | Remove SRR | Extendable/ Table 7.5.4.19-1 | Not applicable |
| 212 | Create SRR | Extendable/ Table 7.5.2.9-1 | Not applicable |
| 213 | Update SRR | Extendable/ Table 7.5.4.21-1 | Not applicable |
| 214 | Session Report | Extendable/Table 7.5.8.7-1 | Not Applicable |
| 215 | SRR ID | Extendable/Clause 8.2.151 | 1 |
| 216 | Access Availability Control Information | Extendable/Table 7.5.2.9-2 | Not applicable |
| 217 | Requested Access Availability Information | Extendable/Clause 8.2.152 | 1 |
| 218 | Access Availability Report | Extendable/Table 7.5.8.6-2 | Not applicable |
| 219 | Access Availability Information | Extendable/Clause 8.2.153 | 1 |
| 220 | Provide ATSSS Control Information | Extendable/Table 7.5.2.10-1 | Not Applicable |
| 221 | ATSSS Control Parameters | Extendable/Table 7.5.3.7-1 | Not Applicable |
| 222 | MPTCP Control Information | Extendable/Clause 8.2.154 | 1 |
| 223 | ATSSS-LL Control Information | Extendable/Clause 8.2.155 | 1 |
| 224 | PMF Control Information | Extendable/Clause 8.2.156 | 1 |
| 225 | MPTCP Parameters | Extendable/Table 7.5.3.7-2 | Not Applicable |
| 226 | ATSSS-LL Parameters | Extendable/Table 7.5.3.7-3 | Not Applicable |
| 227 | PMF Parameters | Extendable/Table 7.5.3.7-4 | Not Applicable |
| 228 | MPTCP Address Information | Extendable/Clause 8.2.157 | 4 |
| 229 | UE Link-Specific IP Address | Extendable/Clause 8.2.158 | 1 |
| 230 | PMF Address Information | Extendable/Clause 8.2.159 | 1 |
| 231 | ATSSS-LL Information | Extendable/Clause 8.2.160 | 1 |
| 232 | Data Network Access Identifier | Variable Length/Clause 8.2.161 | Not applicable |
| 233 | UE IP address Pool Information | Extendable/Table 7.4.4.1-3 | Not Applicable |
| 234 | Average Packet Delay | Extendable/Clause 8.2.162 | 4 |
| 235 | Minimum Packet Delay | Extendable/Clause 8.2.163 | 4 |
| 236 | Maximum Packet Delay | Extendable/Clause 8.2.164 | 4 |
| 237 | QoS Report Trigger | Extendable/Clause 8.2.165 | 1 |
| 238 | GTP-U Path QoS Control Information | Extendable/Table 7.4.4.1.3-1 | Not Applicable |
| 239 | GTP-U Path QoS Report (PFCP Node Report Request) | Extendable/Table 7.4.5.1.5-1 | Not Applicable |
| 240 | QoS Information in GTP-U Path QoS Report | Extendable/Table 7.4.5.1.6-1 | Not Applicable |
| 241 | GTP-U Path Interface Type | Extendable/Clause 8.2.166 | 1 |
| 242 | QoS Monitoring per QoS flow Control Information | Extendable/Table 7.5.2.9-3 | Not applicable |

TABLE 8.1.2-1-continued

Information Element Types

| IE Type value (Decimal) | Information elements | Comment/Reference | Number of Fixed Octets |
|---|---|---|---|
| 243 | Requested QoS Monitoring | Extendable/Clause 8.2.167 | 1 |
| 244 | Reporting Frequency | Extendable/Clause 8.2.168 | 1 |
| 245 | Packet Delay Thresholds | Extendable/Clause 8.2.169 | 1 |
| 246 | Minimum Wait Time | Extendable/Clause 8.2.170 | 4 |
| 247 | QoS Monitoring Report | Extendable/Table 7.5.8.6-3 | Not applicable |
| 248 | QoS Monitoring Measurement | Extendable/Clause 8.2.171 | 1 |
| 249 | MT-EDT Control Information | Extendable/Clause 8.2.172 | 1 |
| 250 | DL Data Packets Size | Extendable/Clause 8.2.173 | 2 |
| 251 | QER Control Indications | Extendable/Clause 8.2.174 | 1 |
| 252 | Packet Rate Status Report | Extendable/Table 7.5.7.1-2 | Not applicable |
| 253 | NF Instance ID | Fixed/Clause 8.2.175 | 16 |
| 254 | Ethernet Context Information | Extendable/Table 7.5.4.21-1 | Not Applicable |
| 255 | Redundant Transmission Parameters | Extendable/Table 7.5.2.2-5, Table 7.5.2.3-4 | Not Applicable |
| 256 | Updated PDR | Extendable/Table 7.5.5.5-1 | Not Applicable |
| 257 | S-NSSAI | Fixed Length/Clause 8.2.176 | 4 |
| 258 | IP version | Extendable/Clause 8.2.177 | 1 |
| 259 | PFCPASReq-Flags | Extendable/Clause 8.2.178 | 1 |
| 260 | Data Status | Extendable/Clause 8.2.179 | 1 |
| 261 | Provide RDS configuration information | Extendable/Table 7.5.2.11-1 | Not Applicable |
| 262 | RDS configuration information | Extendable/Clause 8.2.180 | 1 |
| 263 | Query Packet Rate Status IE within PFCP Session Modification Request | Extendable/Table 7.5.4.22-1 | Not Applicable |
| 264 | Packet Rate Status Report IE within PFCP Session Modification Response | Extendable/Table 7.5.5.4-1 | Not Applicable |
| 265 | MPTCP Applicable Indication | Extendable/Clause 8.2.181 | 1 |
| 266 | Bridge Management Information Container | Variable Length/Clause 8.2.182 | Not Applicable |
| 267 | UE IP Address Usage Information | Extendable/Table 7.4.4.3.1-1 | Not Applicable |
| 268 | Number of UE IP Addresses | Extendable/Clause 8.2.183 | 1 |
| 269 | Validity Timer | Extendable/Clause 8.2.184 | 2 |
| 270 | Redundant Transmission Forwarding Parameters | Extendable/Table 7.5.2.3-4 | Not Applicable |
| 271 | Transport Delay Reporting | Extendable/Table 7.5.2.2-6 | Not Applicable |
| 272 | Partial Failure Information (PFCP Session Establishment Response) | Extendable/Table 7.5.3.1-2 | Not Applicable |
| 273 | Partial Failure Information (PFCP Session Modification Response) | Extendable/Table 7.5.5.1-2 | Not Applicable |
| 274 | Offending IE Information | Variable Length/Clause 8.2.152 | Not Applicable |
| 275 | RAT Type | Extendable/Table 8.2.186 | 1 |
| aa | Predefined Rule Name | Variable Length/Clause 8.2.xx | Not Applicable |
| 276 to 32767 | Spare. For future use. | | |
| 32768 to 65535 | Reserved for vendor specific IEs | | |

In an embodiment, the following content may be added into 3GPP TS 29.244 V17.1.0.

8.2.xx Predefined Rule Name

Figure 8:
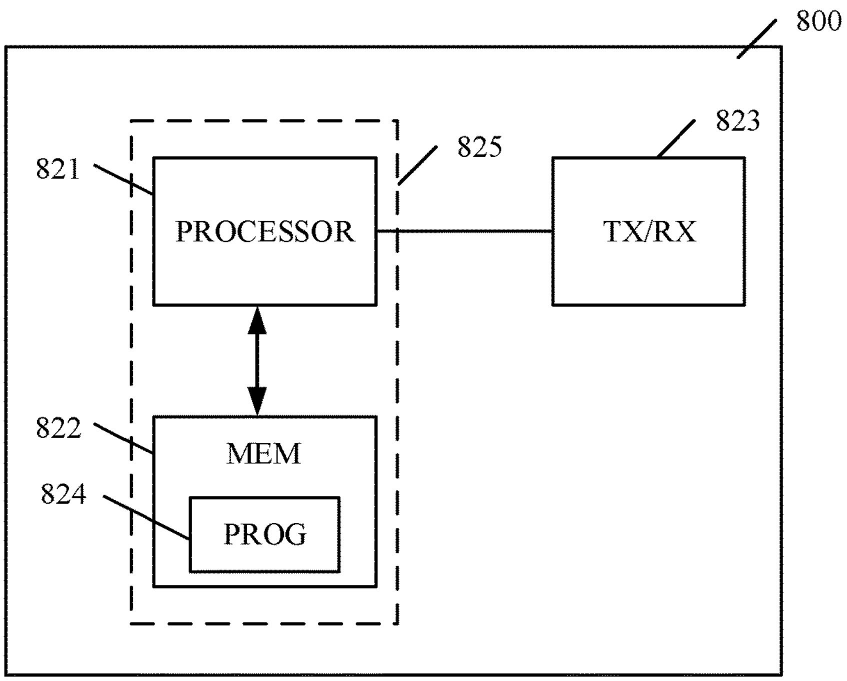
FIG. 8 is a block diagram showing an apparatus suitable for practicing some embodiments of the disclosure.

The Predefined Rule Name IE type shall be coded as shown in FIG. 8.2.xx-1. It shall contain a Predefined Rules Name, referring to one or more predefined rules which are activated in the UP function.

| | Bits | | | | | | | |
|---|---|---|---|---|---|---|---|---|
| Octets | 8 | 7 | 6 | 5 | 4 | 3 | 2 | 1 |
| 1 to 2 | Type = aa (decimal) | | | | | | | |
| 3 to 4 | Length = n | | | | | | | |
| 5 to (n + 4) | Predefined Rules Name | | | | | | | |

FIG. 8.2.xx-1: Predefined Rule Name

The Predefined Rules Name field shall be encoded as an OctetString.

In an embodiment, Table 7.5.8.3-1 of 3GPP TS 29.244 V17.1.0 may be amended as following.

TABLE 7.5.8.3-1

Usage Report IE within PFCP Session Report Request
Octet 1 and 2 Usage Report IE Type = 80 (decimal)
Octets 3 and 4 Length = n

| Information elements | P | Condition/Comment | Appl. Sxa | Sxb | Sxc | N4 | IE Type |
|---|---|---|---|---|---|---|---|
| URR ID | M | This IE shall identify the URR for which usage is reported. | X | X | X | X | URR ID |
| UR-SEQN | M | This IE shall uniquely identify the Usage Report for the URR (see clause 5.2.2.3). | X | X | X | X | UR-SEQN |
| Usage Report Trigger | M | This IE shall identify the trigger for this report. | X | X | X | X | Usage Report Trigger |
| Start Time | C | This IE shall be present, except if the Usage Report Trigger indicates ‘Start of Traffic’, ‘Stop of Traffic’ or ‘MAC Addresses Reporting’.<br>When present, this IE shall provide the timestamp when the collection of the information in this report was started. | X | X | X | X | Start Time |
| End Time | C | This IE shall be present, except if the Usage Report Trigger indicates ‘Start of Traffic’, ‘Stop of Traffic’ or ‘MAC Addresses Reporting’.<br>When present, this IE shall provide the timestamp when the collection of the information in this report was generated. | X | X | X | X | End Time |
| Volume Measurement | C | This IE shall be present if a volume measurement needs to be reported. (NOTE 2) | X | X | X | X | Volume Measurement |
| Duration Measurement | C | This IE shall be present if a duration measurement needs to be reported. (NOTE 2) | X | X | X | X | Duration Measurement |
| Application Detection Information | C | This IE shall be present if application detection information needs to be reported. | — | X | X | X | Application Detection Information |
| UE IP address | C | This IE shall be present if the start or stop of an application has been detected and no UE IP address was provisioned in the PDI. See NOTE 1. | — | — | X | X | UE IP address |
| Network Instance | C | This IE shall be present if the start or stop of an application has been detected, no UE IP address was provisioned in the PDI and multiple PDNs with overlapping IP addresses are used in the UP function. See NOTE 1. | — | — | X | X | Network Instance |
| Time of First Packet | C | This IE shall be present if available for this URR. | — | X | X | X | Time of First Packet |
| Time of Last Packet | C | This IE shall be present if available for this URR. | — | X | X | X | Time of Last Packet |
| Usage Information | C | This IE shall be present if the UP function reports Usage Reports before and after a Monitoring Time, or before and after QoS enforcement. When present, it shall indicate whether the usage is reported for the period before or after that time, or before or after QoS enforcement. | X | X | X | X | Usage Information |
| Query URR Reference | C | This IE shall be present if this usage report is sent as a result of a query URR received in a PFCP Session Modification Request and the Query URR Reference IE was present in the PFCP Session Modification Request.<br>When present, it shall be set to the Query URR Reference value received in the PFCP Session Modification Request. | X | X | X | X | Query URR Reference |
| Event Time Stamp | C | This IE shall be present, if the report is related to an event.<br>When present, it shall be set to the time when the event occurs.<br>Several IEs with the same IE type may be present to report multiple occurrences for an event for this URR ID. | — | X | X | X | Time Stamp |
| Ethernet Traffic Information | C | This IE shall be present if Ethernet Traffic Information needs to be reported. See Table 7.5.8.3-3. | — | — | — | X | Ethernet Traffic Information |
| Join IP Muticast Information | C | This IE shall be present if the UPF needs to report that it has added the PDU session to the DL replication tree of a new IP multicast flow.<br>Several IEs with the same IE type may be present to report multiple IP multicast flows added to the PDU session. | — | — | — | X | Join IP Multicast Information |
| Leave IP Muticast Information | C | This IE shall be present if the UPF needs to report that it has removed the PDU session from the DL replication tree of an IP multicast flow.<br>Several IEs with the same IE type may be present to report multiple IP multicast flows removed from the PDU session. | — | — | — | X | Leave IP Multicast Information |

TABLE 7.5.8.3-1-continued

Usage Report IE within PFCP Session Report Request
Octet 1 and 2 Usage Report IE Type = 80 (decimal)
Octets 3 and 4 Length = n

| Information elements | P | Condition/Comment | Appl. Sxa | Appl. Sxb | Appl. Sxc | Appl. N4 | IE Type |
|---|---|---|---|---|---|---|---|
| PDR ID | O | This IE may be present to identify the PDR if the usage report is generated for a predefined URR which was activated via an Activate Predefined Rules IE in a Create PDR IE or an Update PDR IE . . . | — | X | — | X | PDR ID |

NOTE 1:
This is the case for unsolicited application reporting by the TDF. The Network instance is required when the UE IP address cannot be used to determine the corresponding PDN connection.
(NOTE 2):
The UP function may send a Usage Report with the Volume/Duration Measurement set to zero.

Embodiments herein may provide many advantages, of which a non-exhaustive list of examples follows. In some embodiments herein, CP function can know information for describing received user traffic which is related to the at least one of the one or more predefined URRs (such as the pre-defined PCC rule associated to the user report from UP function) in case of pre-defined PDR use cases. In some embodiments herein, based on information for describing received user traffic which is related to the at least one of the one or more predefined URRs (such as pre-defined PCC rule), CP function can perform any suitable action such as deciding the charging method online or offline and can also deciding other parameters to be enforced, e.g., usage monitoring or QoS parameters. The embodiments herein are not limited to the features and advantages mentioned above. A person skilled in the art will recognize additional features and advantages upon reading the following detailed description.

FIG. 8 is a block diagram showing an apparatus suitable for practicing some embodiments of the disclosure. For example, any one of the CP function entity or UP function entity described above may be implemented as or through the apparatus 800.

The apparatus 800 comprises at least one processor 821, such as a digital processor (DP), and at least one memory (MEM) 822 coupled to the processor 821. The apparatus 800 may further comprise a transmitter TX and receiver RX 823 coupled to the processor 821. The MEM 822 stores a program (PROG) 824. The PROG 824 may include instructions that, when executed on the associated processor 821, enable the apparatus 800 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the CP function entity, the memory 822 contains instructions executable by the processor 821, whereby the CP function entity operates according to any of the methods related to the CP function entity as described above.

In an embodiment where the apparatus is implemented as or at the UP function entity, the memory 822 contains instructions executable by the processor 821, whereby the UP function entity operates according to any of the methods related to the UP function entity as described above.

Figure 9:
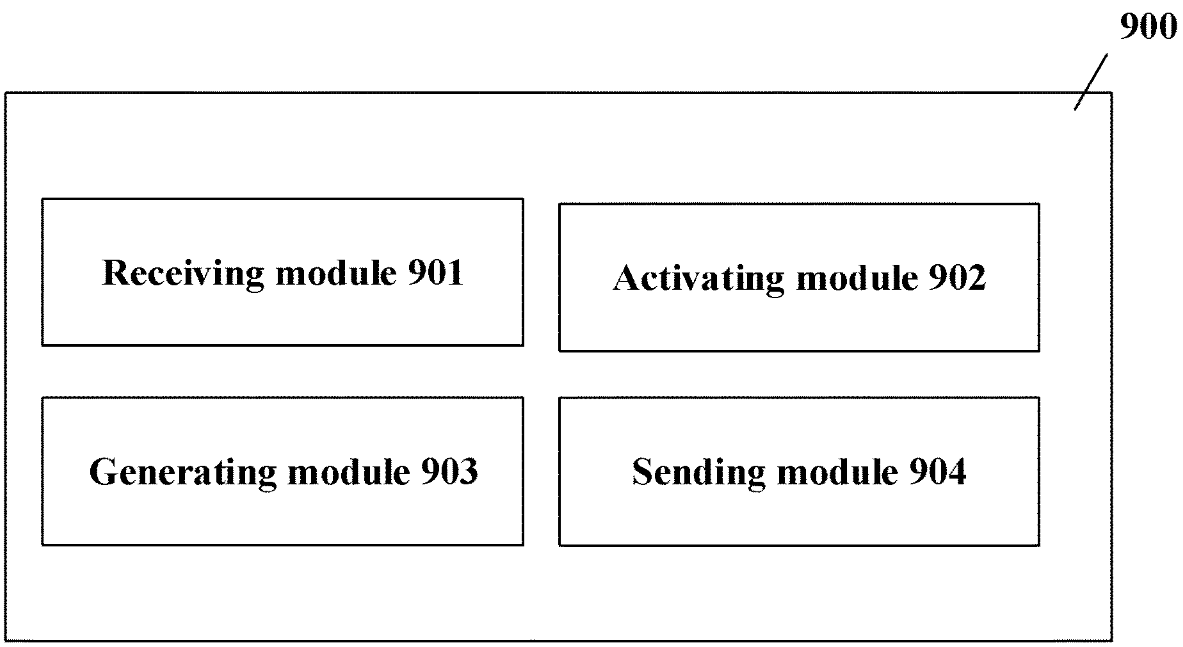
FIG. 9 is a block diagram showing a user plane function entity according to an embodiment of the disclosure.

FIG. 9 is a block diagram showing a user plane function entity according to an embodiment of the disclosure. As shown, the user plane function entity 900 comprises a receiving module 901 configured to receive a first message from a control plane function entity. The first message comprises one or more information elements referencing one or more pre-defined packet detection rules (PDRs) configured in the user plane function entity. The one or more pre-defined PDRs specify one or more predefined usage reporting rules (URRs). The user plane function entity 900 further comprises an activating module 902 configured to activate the one or more pre-defined PDRs. The user plane function entity 900 further comprises a generating module 903 configured to generate a usage report for at least one of the one or more predefined URRs. The usage report comprises information for describing received user traffic which is related to the at least one of the one or more predefined URRs. The user plane function entity 900 further comprises a sending module 904 configured to send a second message comprising the usage report to the control plane function entity.

Figure 10:
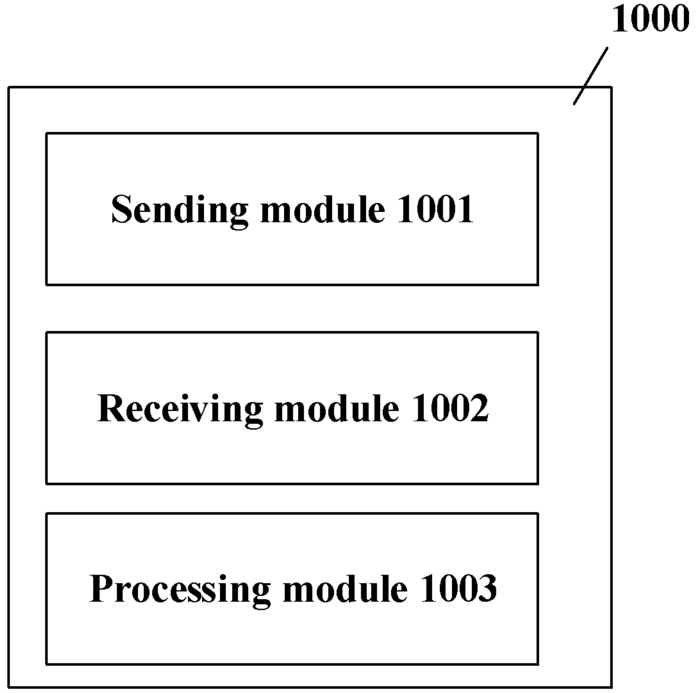
FIG. 10 is a block diagram showing a control plane function entity according to an embodiment of the disclosure.

FIG. 10 is a block diagram showing a control plane function entity according to an embodiment of the disclosure. As shown, the control plane function entity 1000 comprises a sending module 1001 configured to send a first message to a user plane function entity. The first message comprises one or more information elements referencing one or more pre-defined packet detection rules (PDRs) configured in the user plane function entity. The one or more pre-defined PDRs specify one or more predefined usage reporting rules (URRs). The control plane function entity 1000 further comprises a receiving module 1002 configured to receive a second message comprising a usage report from the user plane function entity. The usage report is generated for at least one of the one or more predefined URRs and the usage report comprises information for describing received user traffic which is related to the at least one of the one or more predefined URRs. The control plane function entity 1000 further comprises a processing module 1003 configured to process the usage report based on the information for describing received user traffic which is related to the at least one of the one or more predefined URRs.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the user plane function entity or the control plane function entity may not need a fixed processor or memory, any computing resource and storage resource may be arranged from the user plane function entity or the control plane function entity in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a user plane function entity, comprising:

receiving a first message from a control plane function entity, wherein the first message comprises one or more information elements referencing one or more predefined packet detection rules (PDRs) configured in the user plane function entity, wherein the one or more pre-defined PDRs specify one or more predefined usage reporting rules (URRs);

activating the one or more pre-defined PDRs;

generating a usage report for at least one of the one or more predefined URRs, wherein the usage report comprises at least one predefined rule name to identify the at least one of the one or more predefined URRs if the usage report is generated for the at least one of the one or more predefined URRs which was activated by the user plane function entity, and information for describing received user traffic which is related to the at least one of the one or more predefined URRs; and sending a second message comprising the usage report to the control plane function entity.

2. The method according to claim 1, wherein the information for describing received user traffic which is related to the at least one of the one or more predefined URRs comprises a PDR identifier.

3. The method according to claim 1, wherein the information describing received user traffic which is related to the at least one of the one or more predefined URRs is used for deriving a predefined policy and charging control rule in the control plane function entity.

4. The method according to claim 2, wherein the PDR identifier is comprised in the first message.

5. The method according to claim 1, wherein the at least one predefined rule name is comprised in the one or more information elements referencing the one or more predefined PDRs.

6. The method according to claim 1, wherein a pre-defined PDR is associated with one or more predefined URRs.

7. The method according to claim 1, wherein the one or more information elements referencing one or more predefined PDRs comprises one or more activate predefined rules information elements.

8. The method according to claim 1, wherein:

the first message comprises at least one of:

a Packet Forwarding Control Protocol (PFCP) Session Establishment Request, or a PFCP Session Modification Request message; and the second message comprises a PFCP session report request message.

9. The method according to claim 1, wherein a predefined rule is predefined with one or more predefined URRs.

10. The method according to claim 1, wherein:

the user plane function entity comprises at least one of:

Packet Data Network Gateway (PGW) user plane (PGW-U), or

User plane Function (UPF); and the control plane function entity comprises at least one of:

Session Management Function (SMF),

PGW control plane (PGW-C), or

PGW-C combined with SMF.

11. A method performed by a control plane function entity, comprising:

sending a first message to a user plane function entity, wherein the first message comprises one or more information elements referencing one or more pre-defined packet detection rules (PDRs) configured in the user plane function entity, wherein the one or more pre-defined PDRs specify one or more predefined usage reporting rules (URRs);

receiving a second message comprising a usage report from the user plane function entity, wherein the usage report comprises at least one predefined rule name to identify the at least one of the one or more predefined URRs if the usage report is generated for at least one of the one or more predefined URRs which was activated by the user plane function entity, and the information for describing received user traffic which is related to the at least one of the one or more predefined URRs; and processing the usage report based on the information for describing received user traffic which is related to the at least one of the one or more predefined URRs.

12. The method according to claim 11, wherein the information for describing received user traffic which is related to the at least one of the one or more predefined URRs comprises a PDR identifier.

13. The method according to claim 11, wherein the information describing received user traffic which is related to the at least one of the one or more predefined URRs is used for deriving a predefined policy and charging control rule in the control plane function entity.

14. The method according to claim 12, wherein the PDR identifier is comprised in the first message.

15. The method according to claim 11, wherein the at least one predefined rule name is comprised in the one or more information elements referencing the one or more predefined PDRs.

16. The method according to claim 11, wherein a predefined PDR is associated with one or more predefined URRs.

17. The method according to claim 11, wherein the one or more information elements referencing one or more predefined PDRs comprises one or more activate predefined rules information elements.

18. The method according to claim 11, wherein:

the first message comprises at least one of:

a Packet Forwarding Control Protocol (PFCP) Session Establishment Request, or a PFCP Session Modification Request message; and the second message comprises a PFCP session report request message.

19. The method according to claim 11, wherein a predefined rule is predefined with one or more predefined URRs.

20. The method according to claim 11, wherein:

the user plane function entity comprises at least one of:

Packet Data Network Gateway (PGW) user plane (PGW-U), or

User plane Function (UPF); and the control plane function entity comprises at least one of:

Session Management Function (SMF),

PGW control plane (PGW-C), or

PGW-C combined with SMF.

21. A user plane function entity, comprising:

a processor; and a memory coupled to the processor, said memory containing instructions executable by said processor, whereby said user plane function entity is operative to:

receive a first message from a control plane function entity, wherein the first message comprises one or more information elements referencing one or more predefined packet detection rules (PDRs) configured in the user plane function entity, wherein the one or more pre-defined PDRs specify one or more predefined usage reporting rules (URRs);

activate the one or more pre-defined PDRs;

generate a usage report for at least one of the one or more predefined URRs, wherein the usage report comprises at least one predefined rule name to identify the at least one of the one or more predefined URRs if the usage report is generated for the at least one of the one or more predefined URRs which was activated by the user plane function entity, and information for describing received user traffic which is related to the at least one of the one or more predefined URRs; and send a second message comprising the usage report to the control plane function entity.

22. The user plane function entity according to claim 21, wherein the information for describing received user traffic which is related to the at least one of the one or more predefined URRs comprises a PDR identifier.

23. A control plane function entity, comprising:

a processor; and a memory coupled to the processor, said memory containing instructions executable by said processor, whereby said control plane function entity is operative to:

send a first message to a user plane function entity, wherein the first message comprises one or more information elements referencing one or more pre-defined packet detection rules (PDRs) configured in the user plane function entity, wherein the one or more predefined PDRs specify one or more predefined usage reporting rules (URRs);

receive a second message comprising a usage report from the user plane function entity, wherein the usage report comprises at least one predefined rule name to identify the at least one of the one or more predefined URRs if the usage report is generated for at least one of the one or more predefined URRs which was activated by the user plane function entity, and the information for describing received user traffic which is related to the at least one of the one or more predefined URRs; and process the usage report based on the information for describing received user traffic which is related to the at least one of the one or more predefined URRs.

24. The control plane function entity according to claim 23, wherein the information for describing received user traffic which is related to the at least one of the one or more predefined URRs comprises a PDR identifier.

* * * * *